United States Patent [19]

Sasaki et al.

[11] Patent Number: 5,530,478
[45] Date of Patent: Jun. 25, 1996

[54] IMAGE DATA COMPRESSING APPARATUS

[75] Inventors: Minoru Sasaki, Tokyo, Japan; Tomoko Kimishima, Edo. Guarico, Venezuela

[73] Assignee: Kabushiki Kaisha Toshiba, Kawasaki, Japan

[21] Appl. No.: 50,012

[22] PCT Filed: Aug. 21, 1992

[86] PCT No.: PCT/JP92/01055

§ 371 Date: Apr. 21, 1993

§ 102(e) Date: Apr. 21, 1993

[87] PCT Pub. No.: WO93/04553

PCT Pub. Date: Apr. 3, 1993

[30] Foreign Application Priority Data

Aug. 21, 1991 [JP] Japan .................... 3-209597
Jan. 13, 1992 [JP] Japan .................... 4-004173
Apr. 15, 1992 [JP] Japan .................... 4-095216

[51] Int. Cl.⁶ ....................................... H04N 7/30
[52] U.S. Cl. ....................................... 348/405
[58] Field of Search ....................... 348/405, 419

[56] References Cited

U.S. PATENT DOCUMENTS

| | | | |
|---|---|---|---|
| 4,839,724 | 6/1989 | Keesen et al. | 348/418 |
| 5,073,820 | 12/1991 | Nakagawa et al. | 348/405 |
| 5,073,821 | 12/1991 | Juri | 348/405 |
| 5,150,208 | 9/1992 | Otaka et al. | 348/420 |
| 5,355,167 | 10/1994 | Juri | 348/405 |

FOREIGN PATENT DOCUMENTS

| | | |
|---|---|---|
| 62-258560 | 11/1987 | Japan . |
| 1157168 | 6/1989 | Japan . |
| 2100487 | 4/1990 | Japan . |
| 2237370 | 9/1990 | Japan . |
| 2305182 | 12/1990 | Japan . |
| 491587 | 3/1992 | Japan . |

OTHER PUBLICATIONS

1989 Autumn National Convention Record IEICE, 0-45, "Bit-rate control method for OCT image coding", Nemoto et al Aug. 1992.

Primary Examiner—Tommy P. Chin
Assistant Examiner—A. Au
Attorney, Agent, or Firm—Cushman Darby & Cushman

[57] ABSTRACT

A DCT coefficient output from a DCT circuit 21 is quantized by different quantization outputs by quantization circuits 22 to 25, and code lengths obtained by encoding the respective quantization outputs are calculated by code length calculation circuits 28 to 31. The code lengths corresponding to one frame obtained by the code length calculation circuits 28 to 31 are accumulated by adders 33 to 36, thereby obtaining a plurality of calculated total bit counts corresponding to the plurality of quantization coefficients. A comparator 37, multipliers 38 and 39, and an adder 40 select, of the plurality of calculated total bit counts, two calculated total bit counts that are close to a target total bit count, and obtain a scale factor used for obtaining a quantization coefficient corresponding to the target total bit count. An optimum quantization coefficient for the subsequent second scanning operation is generated by a quantization coefficient generator 27 by using the scale factor.

13 Claims, 18 Drawing Sheets

| 0-RUN | AMPLI-TUDE | HAFFMAN CODE |
|---|---|---|
| 0 | 0 | 1010 |
| 0 | 1 | 00 |
| 0 | 2 | 01 |
| 0 | 3 | 100 |
| 0 | 4 | 1011 |
| 0 | 5 | 11010 |
| 0 | 6 | 111000 |
| 0 | 7 | 1111000 |
| 0 | 8 | 1111110110 |
| 0 | 9 | 11111111000000 |
| 0 | A | 111111111000010 |
| 1 | 1 | 1100 |
| 1 | 2 | 111001 |
| 1 | 3 | 111001 |
| 1 | 4 | 1111010 |
| 1 | 5 | 111110110 |
| 1 | 6 | 1111111100000011 |
| 1 | 7 | 1111111100000100 |
| 1 | 8 | 1111111100000101 |
| 1 | 9 | 1111111100000110 |
| 1 | A | 1111111100000111 |
| 2 | 1 | 11011 |
| 2 | 2 | 1111000 |
| 2 | 3 | 1111110111 |
| 2 | 4 | 1111111100001000 |
| 2 | 5 | 1111111100001001 |
| 2 | 6 | 1111111100001010 |
| 2 | 7 | 1111111100001011 |
| 2 | 8 | 1111111100001100 |
| 2 | 9 | 1111111100001101 |
| 2 | A | 1111111100001110 |
| 3 | 1 | 111010 |
| 3 | 2 | 1111011 |
| 3 | 3 | 11111101111 |
| 3 | 4 | 1111111100001111 |
| 3 | 5 | 1111111100010000 |
| 3 | 6 | 1111111100010001 |
| 3 | 7 | 1111111100010010 |
| 3 | 8 | 1111111100010011 |
| 3 | 9 | 1111111100010100 |
| 3 | A | 1111111100010101 |
| 4 | 1 | 111011 |

FIG. 5

| 16 | 11 | 10 | 16 | 24 | 40 | 51 | 61 |
|----|----|----|----|----|----|----|----|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

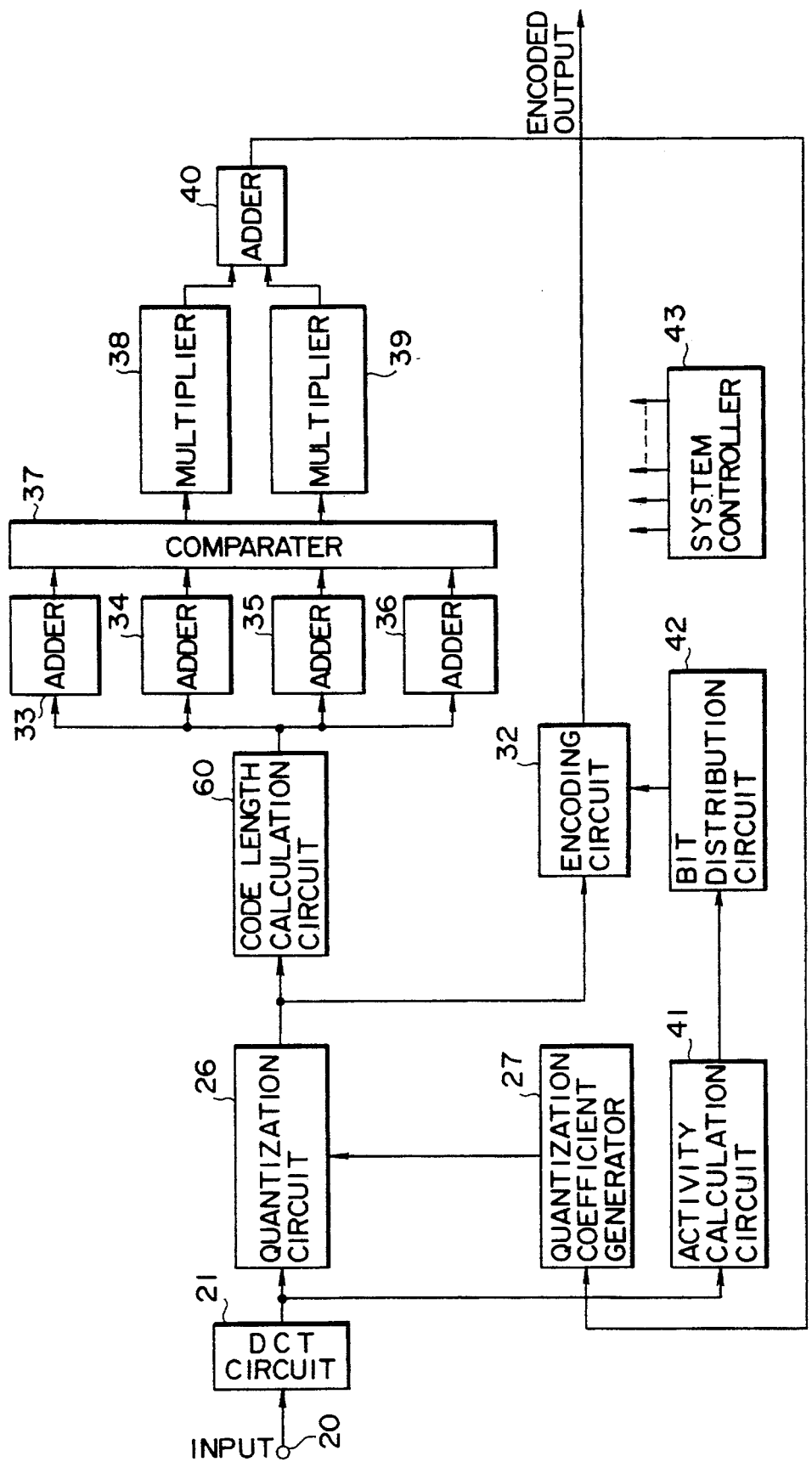
F I G. 10

| 1 BLOCK | | | | | | | | |
|---|---|---|---|---|---|---|---|---|
| Q0 | Q1 | Q0 | Q1 | Q0 | Q1 | | Q0 | Q1 |
| Q2 | Q3 | Q2 | Q3 | Q2 | Q3 | | Q2 | Q3 |
| Q0 | Q1 | Q0 | Q1 | Q0 | Q1 | | Q0 | Q1 |
| | | | | | | | | |
| Q2 | Q3 | Q2 | Q3 | Q2 | Q3 | | Q2 | Q3 |

FIG. 11

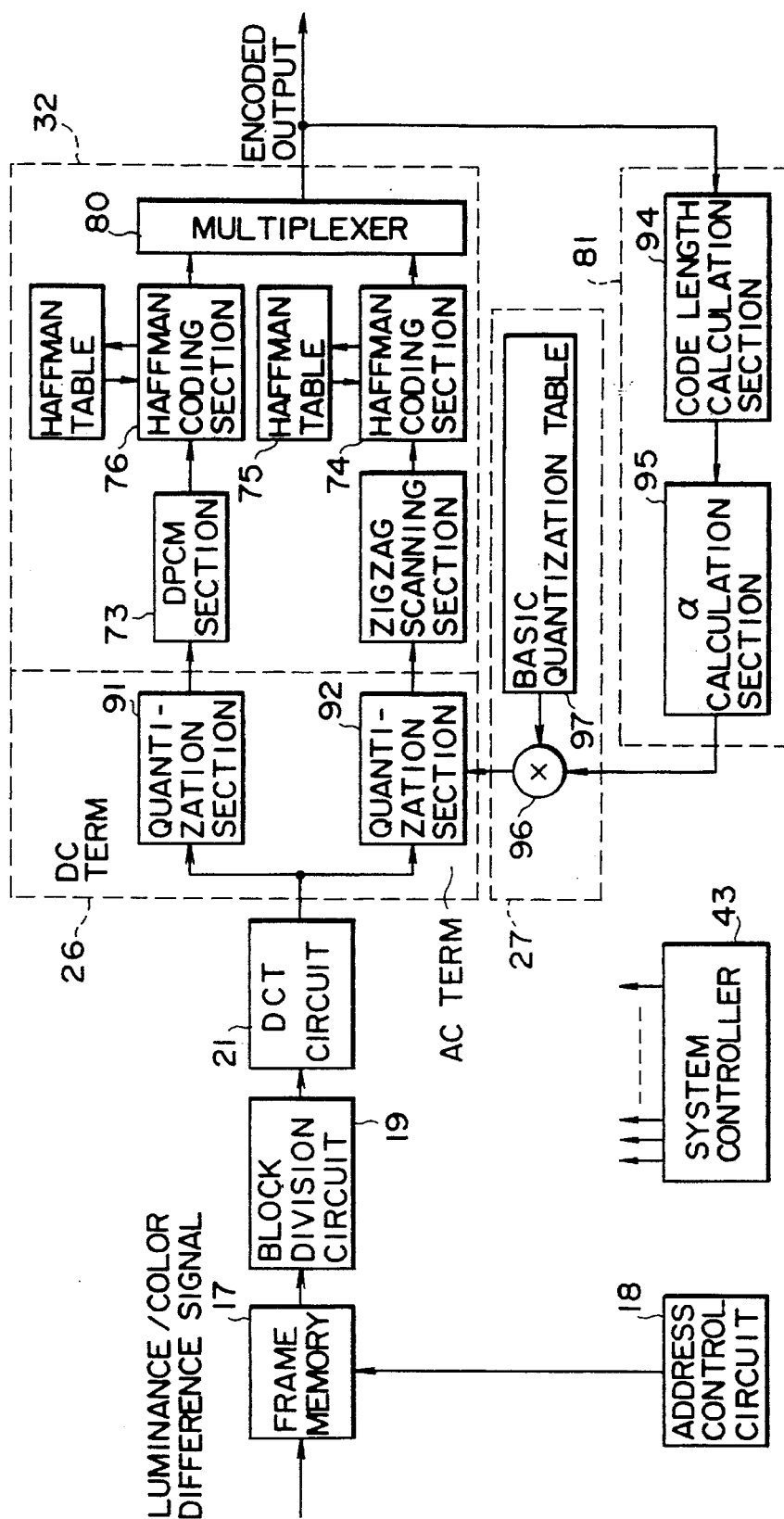
F I G. 14

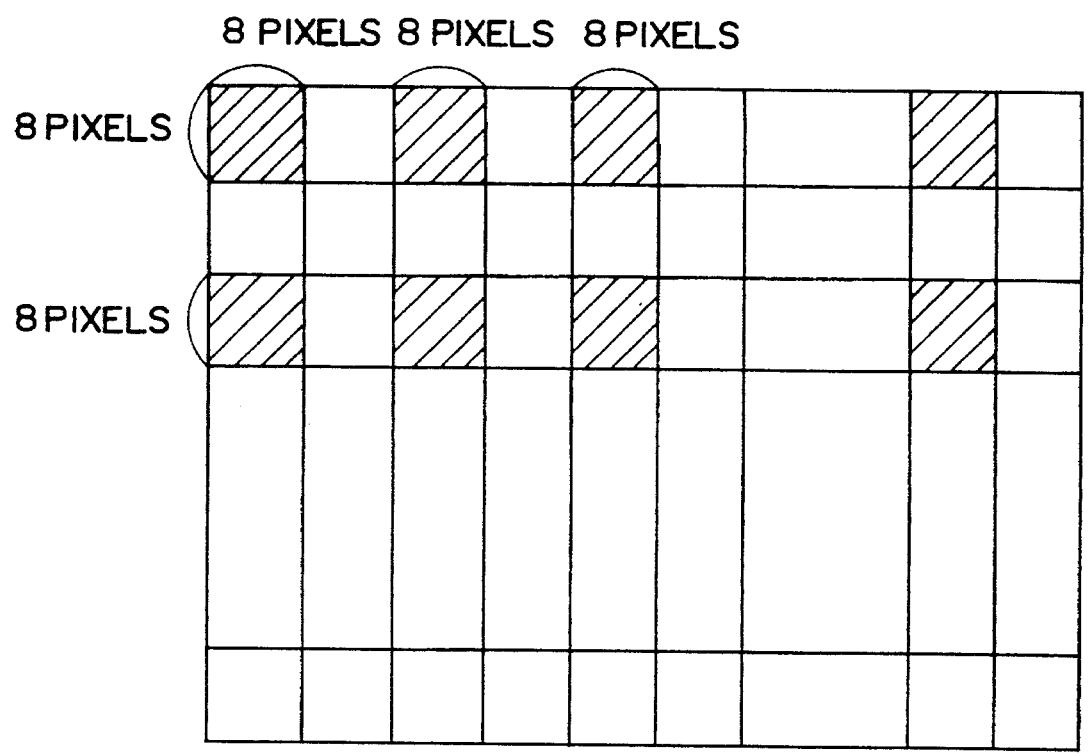
F I G. 15

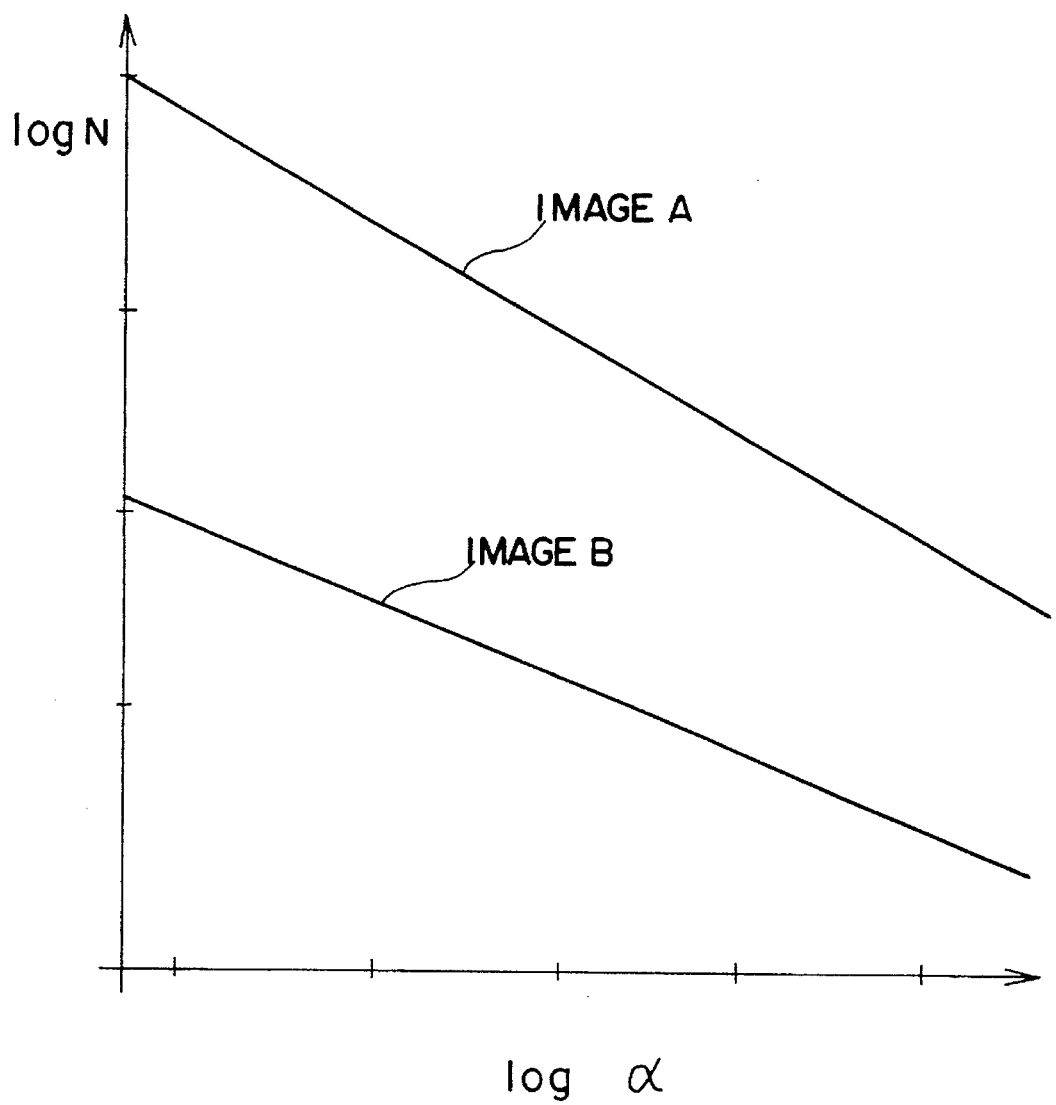
F I G. 16

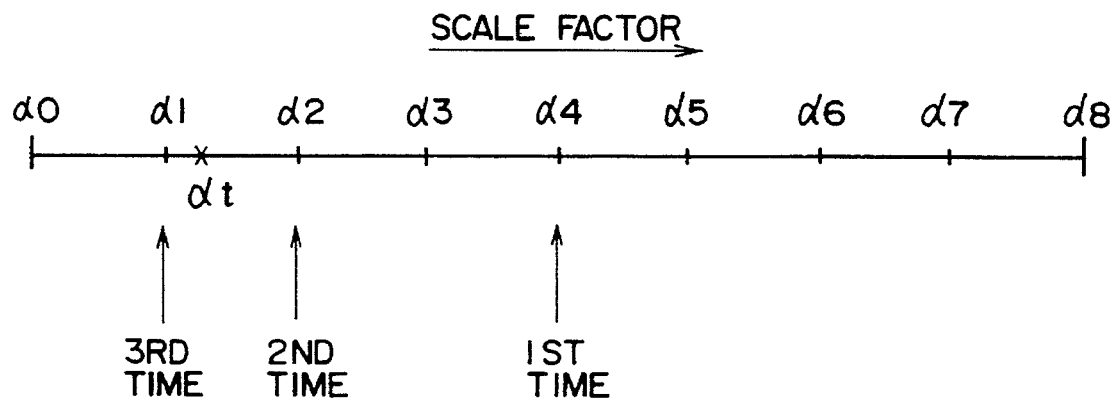
F I G. 21
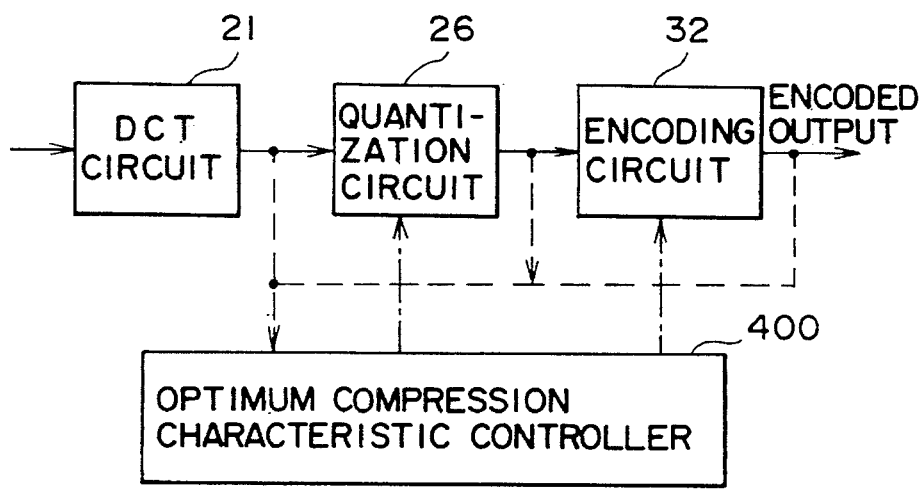
F I G. 22

IMAGE DATA COMPRESSING APPARATUS

TECHNICAL FIELD

The present invention relates to an image data compressing apparatus and, more particularly, to an image data compressing apparatus suitable for encoding and compressing still and motion images of a visual telephone, an image transmitting apparatus, an electronic still camera, and the like.

BACKGROUND ART

In recent years, as visual telephones, electronic still cameras, and like are widely used, an image digital processing technique, especially a high-efficiency encoding technique for compressing image data, is progressing.

For example, an image data compressing apparatus using the high-efficiency encoding technique has an arrangement as follows. Input image data is divided into a plurality of data blocks by a block division circuit. One block is constituted by data of, e.g., 8 horizontal pixels×8 vertical pixels=64 pixels. Block image data is input to a DCT (Discrete Cosine Transformation) circuit to be transformed into DCT coefficients representing frequency components. A DCT coefficient output from the DCT circuit is input to a quantization circuit to be quantized. A quantization output is input to a variable length encoding circuit to be encoded by utilizing Haffman codes. An encoded output is input to a buffer memory. Output information from the buffer memory is output to a transmission path, e.g., a telephone circuit, or a recording medium, e.g., a memory card. The buffer memory is provided to control the amount of output information. A change in information amount in the buffer memory is monitored by a quantization control circuit. Upon reception of information representing a change in information amount in the buffer memory, the quantization control circuit switches the quantization coefficients of the quantization circuit and performs control as required so the output information amount falls within a predetermined range.

The buffer memory and the quantization control circuit are provided due to the following reason. When an image is compressed by the system described above in accordance with variable length encoding, generally, an image constituted by fine patterns corresponds to a quantization output and an encoded output each having a large bit count, and an image constituted by a monotonous pattern corresponds to a quantization output and an encoded output each having a small bit count. If the quantization control circuit is not provided, the transmission rate becomes excessive, or the capacity of the recording medium becomes short.

In the conventional image data compressing apparatus, the quantization characteristics are controlled for the sole purpose of constantly limiting the output information amount to fall within the predetermined range.

On the other hand, however, since the quantization characteristics are constantly controlled, when an encoded image signal is decoded, the image quality is degraded. For example, assume that an image of a frame, an upper half of which is constituted by a monotonous pattern and a lower half of which is constituted by fine patterns, is to be quantized. When the image data of the upper half region is to be quantized, an excessive bit count is assigned to it; when the image data of the lower half region is to be quantized, an insufficient bit count is assigned to it. Thus, the image quality is degraded. In other words, the image quality differs between the upper and lower regions of the frame, reproducing an unnatural image.

DISCLOSURE OF INVENTION

It is, therefore, an object of the present invention to provide an image data compressing apparatus capable of achieving both prevention of a degradation in image quality and stabilization of the output information amount of compression data by selecting a switching timing of the compression processing characteristics (quantization characteristics and/or encoding characteristics) of the image data.

It is another object of the present invention to provide an image data compressing apparatus capable of obtaining optimum compression processing characteristics in units of frames within a short period of time.

It is still another object of the present invention to provide an image data compressing apparatus capable of controlling the optimum variable length encoding characteristics when the optimum compression processing characteristics are to be obtained in units of frames.

In order to achieve the above objects, according to the present invention, there is provided an image data compressing apparatus for compressing and outputting input image data, comprising DCT means for receiving block data obtained by dividing the input image data into blocks and obtaining a DCT coefficient by subjecting the block data of each of the blocks to discrete cosine transformation (DCT), main quantizing means for obtaining a quantization output by quantizing the DCT coefficient obtained by the DCT means, main encoding means for obtaining an encoded output by encoding the quantization output from the quantizing means in accordance with variable code length encoding, and optimum compression characteristic determining means for receiving one of the DCT coefficient, the quantization output, and the encoded output and generating an optimum quantization coefficient used by at least the quantizing means, the optimum compression characteristic determining means serving to quantize the DCT coefficient by using a plurality of types of quantization coefficients during a first scanning period corresponding to one frame of the input image data, thus obtaining a plurality of quantization outputs, obtain a plurality of calculated total bit counts for a plurality of encoded outputs corresponding to the plurality of quantization outputs, generate an optimum quantization coefficient for the input image data from an operation result obtained by using one of the plurality of calculated total bit counts which is close to a target total bit count, supply the optimum quantization coefficient to the quantizing means, and set optimum compression characteristics for a second scanning operation.

The optimum quantization characteristics of one frame are determined by the above-described means, and non-uniformity in image quality on the screen is eliminated. Note that the "one scanning period" means a period during which the entire frame is scanned once.

BRIEF DESCRIPTION OF DRAWINGS

FIG. 5 is a table for explaining Haffman codes, FIG. 10 is a block diagram showing still another embodiment of the present invention, FIG. 11 is a table showing quantization coefficients used when the quantization characteristics are determined, FIG. 14 is a block diagram showing still another embodiment of the present invention, FIG. 15 is a table of image blocks for explaining the operation of the embodiment of FIG. 14, FIG. 16 is a graph showing the relationship between a scale factor and a total bit length for explaining the operation of the embodiment of FIG. 14, FIG. 21 is a view of a scale factor for explaining the embodiment of FIG. 20, and FIG. 22 is a block diagram summarizing the respective embodiments of the present invention.

BEST MODE OF CARRYING OUT THE INVENTION

The preferred embodiments of the present invention will be described with reference to the accompanying drawings.

Figure 1:
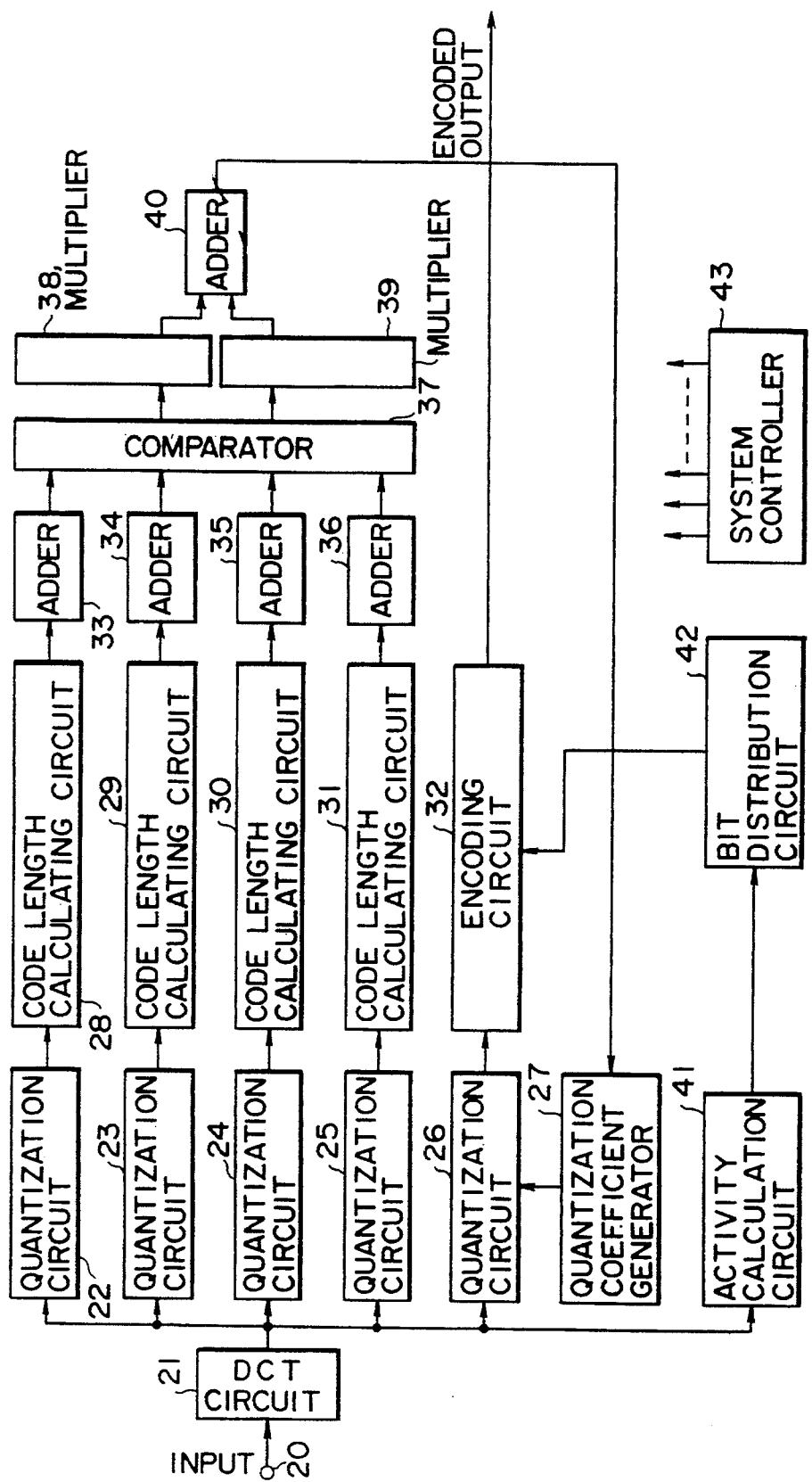
FIG. 1 is a block diagram showing an embodiment of the present invention.
Figures 2, 3:
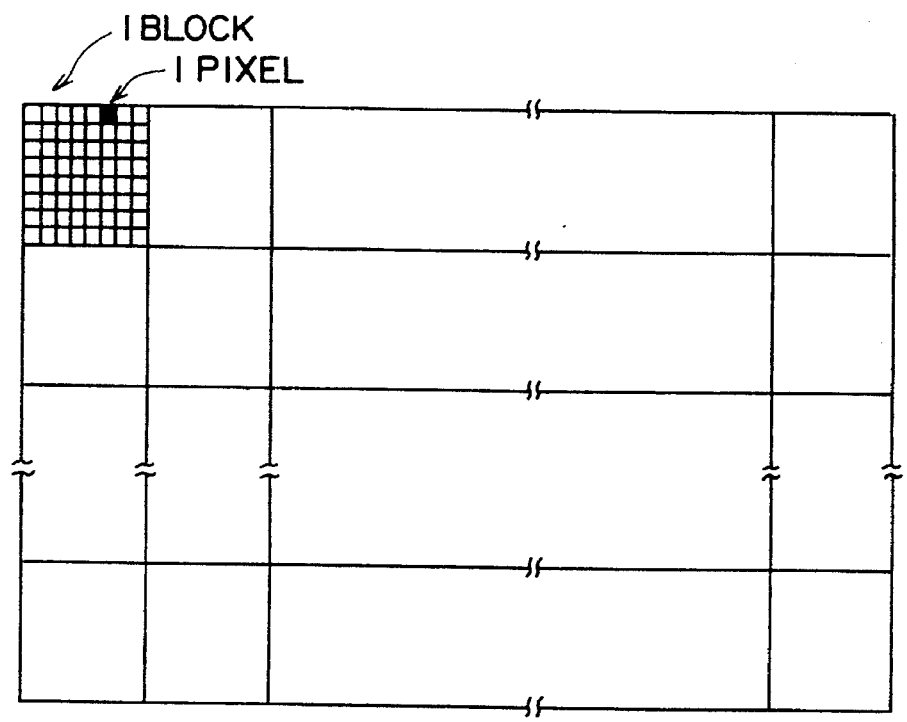
FIG. 2 is a table for explaining image data input to the apparatus of FIG. 1.
FIG. 3 is a table showing the DCT coefficients of the apparatus of FIG. 1.

FIG. 1 shows an embodiment of the present invention, and FIG. 2 is a table for explaining image data input to an input terminal 20.

The entire circuit of FIG. 1 will be briefly described. A system for quantizing and encoding input image data to form compressed data to be transmitted is constituted by a DCT circuit 21, a quantization circuit 26, and an encoding circuit 32. Quantization circuits 22 to 25, code length calculation circuits 28 to 31, adders 33 to 36, a comparator 37, multipliers 38 and 39, and an adder 40 constitute an optimum quantization characteristic determinator for determining optimum quantization characteristics. In the first scanning operation, the optimum quantization characteristic determinator uses image data corresponding to one frame to determine the optimum quantization characteristics suited to this image data. The input image data is read out from a memory medium, e.g., a frame memory, divided into blocks, and supplied to the input terminal 20. An optimum scale factor $\alpha_t$ serving as a determination signal used for obtaining the optimum quantization characteristics is obtained from the adder 40. The scale factor $\alpha_t$ is supplied to a quantization coefficient generator 27. The quantization coefficient generator 27 sets an optimum quantization table (quantization coefficients) used by the quantization circuit 26 in accordance with the scale factor $\alpha_t$. Then, in the second scanning operation, when the input image data is quantized by the quantization circuit 26, optimum quantization values (quantization output) can be obtained.

The arrangement of the circuit of FIG. 1 will be described in detail.

Block data obtained by dividing image data as shown in FIG. 2 into blocks, each consisting of 8 horizontal pixels×8 vertical pixels=64 pixels, is supplied to the input terminal 20. The block data is subjected to DCT processing by the DCT circuit 21 to be transformed into DCT coefficients representing frequency components. The DCT circuit 21 outputs 64 DCT coefficients for each block.

FIG. 3 is a table showing the DCT coefficients output from the DCT circuit 21. The DCT coefficients are sequentially arranged in the order of low-frequency components to high-frequency components in the horizontal and vertical directions. The DCT circuit 21 scans the DCT coefficients in the zigzag manner from the low-frequency components to the high-frequency components in the horizontal and vertical directions, as indicated by the numerals in FIG. 3, and outputs the DCT coefficients in the scanning order. A box of number 0 in FIG. 3 indicates a DC term whose value is an average of all the pixels. Boxes of other numbers indicate AC terms.

In this embodiment, the output from the DCT circuit 21 is supplied to the quantization circuits 22 to 25 and the quantization circuit 26. The quantization circuits 22 to 25 are utilized for obtaining a determination signal used for setting transmission data after encoding to have an optimum bit count per predetermined period of time (corresponding to one frame). In the following description, the bit count of a compression output corresponding to one frame will be referred to as a total bit count (total code amount or total code length). The quantization characteristics of the quantization circuit 26 are determined in accordance with the determination signal.

Figure 4:
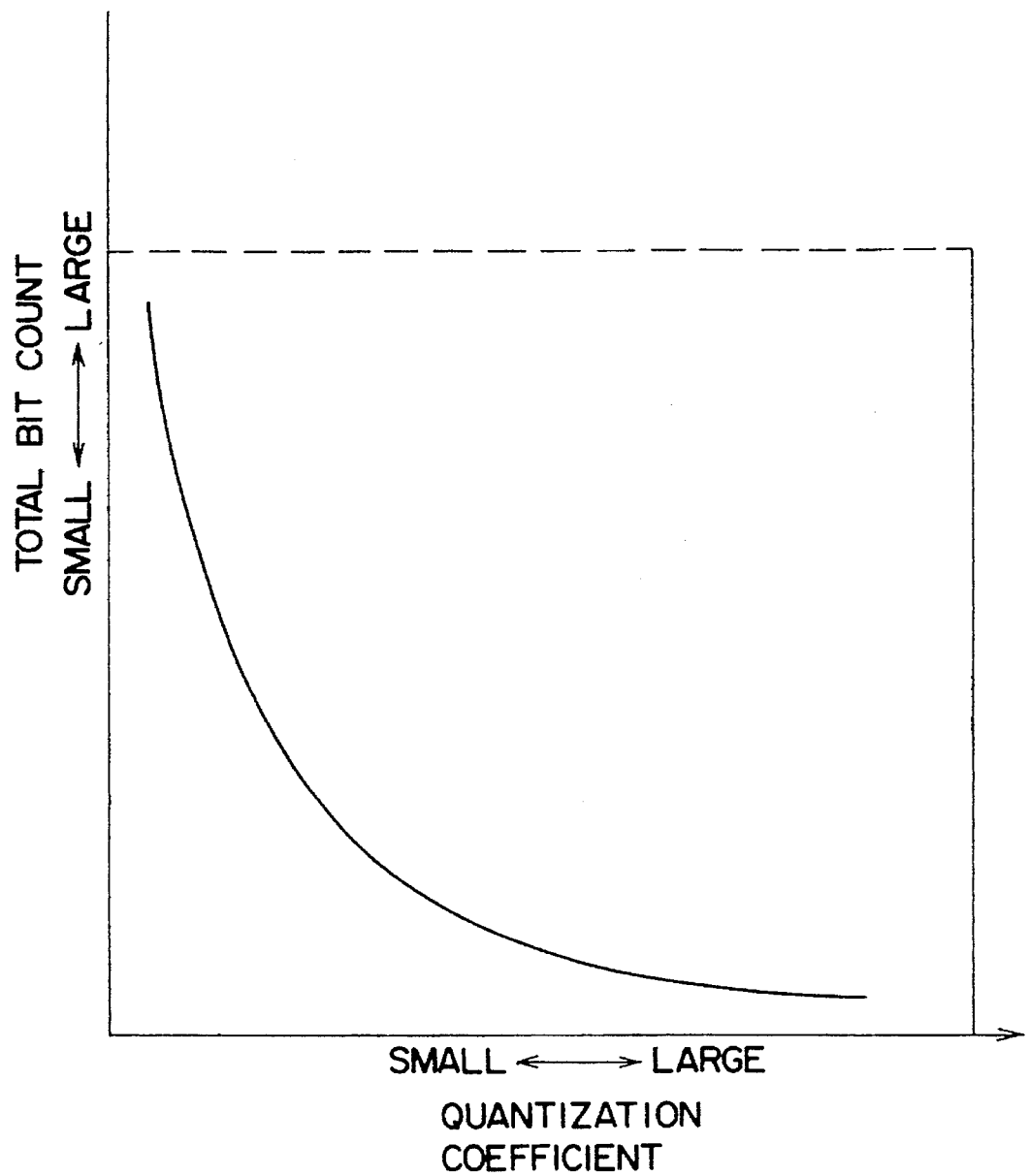
FIG. 4 is a graph for explaining the relationship between a quantization coefficient and a total bit count of an encoded output.

When data corresponding to one block or one frame is encoded in accordance with Haffman coding, the total bit count of the data changes depending on the image content. The total bit count also changes depending on the quantization coefficient used for quantization. For example, when the quantization coefficient is increased, 0 is likely to appear as the quantization value at a high probability, and the total bit count is decreased. In FIG. 4, the quantization coefficients are taken along the axis of abscissa and the total bit count is taken along the axis of ordinate to show a change in total bit count depending on the quantization coefficient.

In general image processing, when the quantization coefficient is increased, the total bit count is rapidly decreased. However, the total bit count obtained when the quantization coefficient is changed differs from one image to another. When image data corresponding to one frame is compressed, in order to know a final total bit count, the image data must temporarily be quantized and then encoded, and the bit count of the encoded compression data must be determined.

Hence, in this embodiment, the quantization circuits 22 to 25 are provided to determine the total bit count after encoding at an early period.

In the first scanning operation, the quantization circuits 22 to 25 quantize a DCT coefficient by predetermined different quantization coefficients. The quantization outputs from the quantization circuits 22 to 25 are input to the corresponding code length calculation circuits 28 to 31. The code length calculation circuits 28 to 31 calculate the respective quantization outputs to obtain bit counts in accordance with, e.g., Haffman coding (encoding in accordance with the same scheme as that of the encoding circuit 32), and supply the respective bit counts to the adders 33 to 36.

The adders 33 to 36 receive the bit counts (code lengths or amounts) of each block from the code length calculation circuits 28 to 31 and calculate the total bit counts by adding to them the bit count corresponding to one frame. The calculated total bit counts obtained by the adders 33 to 36 and each corresponding to one frame are input to the comparator 37. The comparator 37 extracts, from the plurality of calculated total bit counts, a calculated total bit count $NB_1$ and a calculated total bit count $NB_2$ which are larger and smaller, respectively, than and near a target total bit count $NB_T$. The two calculated total bit counts $NB_1$ and $NB_2$ are input to the multipliers 38 and 39.

The multipliers 38 and 39 perform operations indicated in following equations (1) and (2), where $Q_1$ is the quantization coefficient for obtaining the calculated total bit count $NB_1$, and $Q_2$ is the quantization coefficient for obtaining the calculated total bit count $NB_2$, and output the calculation results to the adder 40. The adder 40 performs an operation indicated in following equation (3) to calculate a quantization coefficient $Q_x$ used for obtaining the target total bit count.

$$Q_1 \cdot (NB_2 - NB_T)/(NB_2 - NB_1) \quad (1)$$

$$Q_2 \cdot (NB_T - NB_1)/(NB_2 - NB_1) \quad (2)$$

$$Q_x = Q_1 \cdot (NB_2 - NB_T)/(NB_2 - NB_1) + Q_2 \cdot (NB_T - NB_1)/(NB_2 - NB_1) \quad (3)$$

In fact, an output from the adder 40 is supplied to the quantization coefficient generator 27 as the scale factor $\alpha_t$ (determination signal) of an optimum quantization coefficient $Q_x$. The quantization coefficient generator 27 sets the quantization coefficient $Q_x$ in the quantization circuit 26 based on the determination signal from the adder 40.

After the quantization coefficient of the quantization circuit 26 is set in this manner, in the second scanning operation, the quantization circuit 26 quantizes the DCT coefficient supplied from the DCT circuit 21, and supplies the quantization output to the encoding circuit 32. The encoding circuit 32 encodes the quantization output in accordance with Haffman coding by dividing it into, e.g., DC and AC terms. More specifically, the encoding circuit 32 calculates a difference between the DC terms of quantization outputs of adjacent blocks and encodes the difference in accordance with Haffman coding. Regarding Haffman coding of the DC terms of the quantization outputs, the encoding circuit 32 scans the table of FIG. 3 in a zigzag manner in the order indicated in FIG. 3 to form combinations of the run length of 0s (0 run) and the bit counts of DCT coefficients immediately following 0s, and encodes these combinations in accordance with Haffman coding.

FIG. 5 shows Haffman codes. For example, when two "0"s continue as quantization outputs and then "1" is input, as shown in FIG. 5, the encoding circuit 32 outputs a Haffman code of "11011".

The quantization coefficient $Q_x$ is calculated with an assumption that changes in total bit counts caused by the quantization coefficients $Q_1$ and $Q_2$ are respectively linear, as shown in above equations (1) and (2). In fact, however, the relationship between the quantization coefficient (scale factor) and the total bit count is not linear, and the quantization coefficient $Q_x$ takes a value larger than an original quantization coefficient $Q_s$. When quantization is performed by using the quantization coefficient $Q_x$ and thereafter Haffman coding is performed, an output total bit count tends to be smaller than the target total bit count $NB_T$. However, since operation of the calculated total bit count and operation of the quantization coefficient $Q_x$ include errors, the output total bit count sometimes becomes larger than the total bit count $NB_T$.

For this reason, bit distribution is performed in units of blocks, so that the total bit count as the final output falls within the range of the total bit count $NB_T$. More specifically, an activity calculation circuit 41 calculates the block activity and frame activity indicating the fineness of the image by using, e.g., the total sum of the DCT coefficients. The block and frame activities are supplied to a bit distribution circuit 42. The bit distribution circuit 42 calculates the bit distribution amount of each block from the block and frame activities. The bit distribution amount from the bit distribution circuit 42 is supplied to the encoding circuit 32.

Hence, when the bit count to be output from the encoding circuit 32 is to exceed the bit distribution amount, the encoding circuit 32 stops encoding to set the output bit count within the range of the bit distribution amount. Thus, the total bit count corresponding to one frame is set within the target total bit count $NB_T$.

Figures 6, 7:
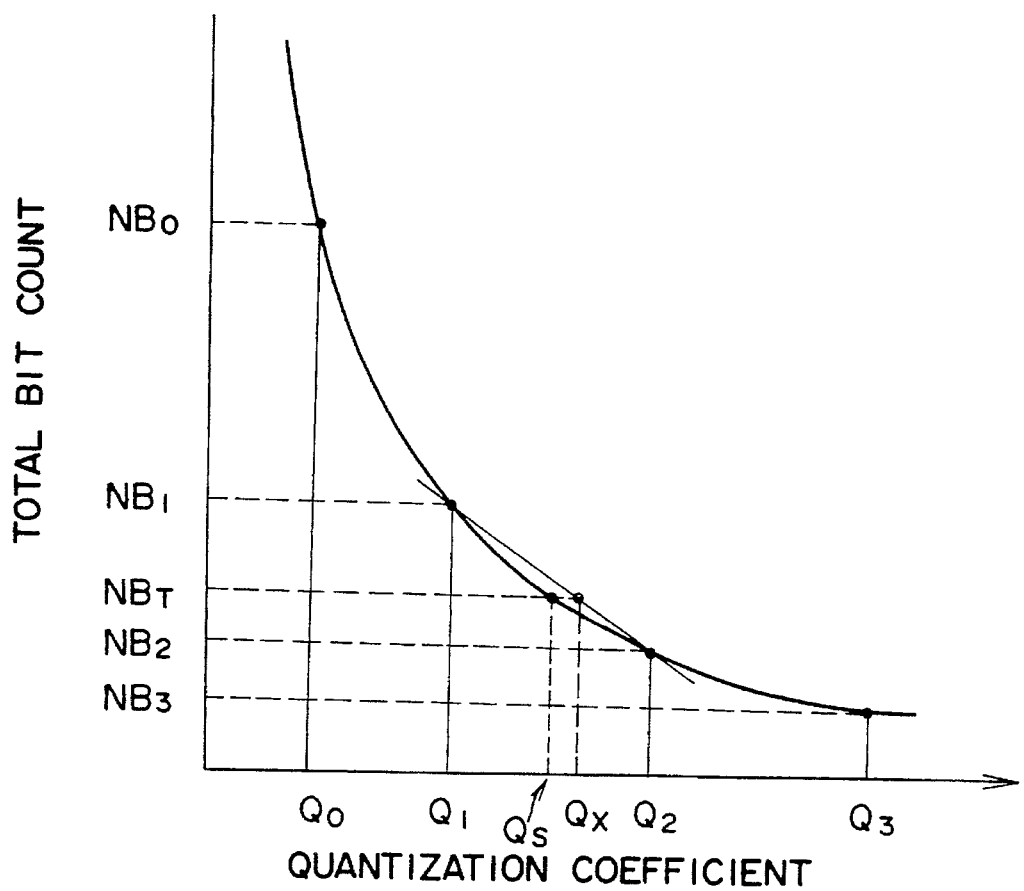
FIG. 6 is a graph for explaining a quantization coefficient and a total bit count of an encoded output.
FIG. 7 is a table showing quantization coefficients.

This embodiment will further be described with reference to FIGS. 6 and 7. FIG. 6 is a graph showing the relationship between the quantization coefficient (or scale factor) and the total bit count, and FIG. 7 is a table showing quantization coefficients.

Block data in units of blocks each constituted by 8×8 pixels is input to the input terminal 20. The block data is DCT-processed by the DCT circuit 21. A DCT coefficient from the DCT circuit 21 is supplied to the quantization circuits 22 to 26 and the activity calculation circuit 41. The quantization circuits 22 to 25 quantize the DCT coefficient with the predetermined corresponding quantization coefficients $Q_0$ to $Q_3$ and supply the respective quantization outputs to the code length calculation circuits 28 to 31. The code length calculation circuits 28 to 31 encode the pairs of the 0 runs of the respective quantization outputs and the bit counts of the quantization coefficients, thus obtaining code lengths, and supply the respective code lengths to the adders 33 to 36. The adders 33 to 36 add the code length of each block to the respective code lengths, thus obtaining a code length (calculated total bit count) corresponding to one frame, and input them to the comparator 37.

Assume that the calculated total bit counts obtained by the adders 33 to 36 are $NB_0$, $NB_1$, $NB_2$, and $NB_3$, respectively, and that the target total bit count $NB_T$ satisfies $NB_1 < NB_T < NT_2$, as shown in FIG. 6. Then, the comparator 37 selects outputs $NB_1$ and $NB_2$ from the adders 34 and 35 and supplies them to the multipliers 38 and 39. The multipliers 38 and 39 performs operations of equations (1) and (2) described above, and the adder 40 performs operation of equation (3). Then, a scale factor corresponding to the quantization coefficients $Q_x$ for obtaining the target total bit count $NB_T$ is obtained. This scale factor is supplied to the quantization coefficient generator 27.

The quantization coefficient generator 27 forms the quantization coefficients shown in, e.g., FIG. 7. The arrangement of the quantization coefficients of FIG. 6 corresponds to the arrangement of the DCT coefficients shown in FIG. 3. The quantization coefficients are supplied to the quantization circuit 26. The quantization circuit 26 divides a DCT coefficient by the corresponding quantization coefficient $Q_x$, thus obtaining a quantization output, and supplies the quantization output to the encoding circuit 32.

Regarding the DC term of the quantization output, the encoding circuit 32 calculates a difference between adjacent blocks, and encodes the difference in accordance with Haffman coding. Regarding the AC term of the quantization output, the encoding circuit 32 encodes a combination of the 0 run and the bit count of the quantization coefficient in accordance with Haffman coding. In this case, if the bit count of the quantization output from the quantization circuit 26 after encoding exceeds the bit distribution amount, the encoding circuit 32 does not encode the combination including this bit count. Therefore, the total bit count corresponding to one frame is set within $NB_T$.

The operation timings of the system and the respective circuit blocks are controlled by a system controller 43.

As described above, in this embodiment, the code lengths of image data corresponding to one frame after encoding are obtained by the quantization circuits 22 to 25, the code length calculation circuits 28 to 31, and the adders 33 to 36 in advance by using different quantization coefficients. By using these code lengths, the comparator 37, the multipliers 38 and 39, and the adder 40 calculate the optimum scale factor corresponding to the optimum quantization coefficients corresponding to the target total bit count (first scanning). In the second scanning operation, the quantization circuit 26 quantizes the DCT coefficient based on the optimum quantization coefficient, thereby realizing optimum quantization throughout the entire frame. Hence, the different regions on one frame do not have different quantization coefficients, and a natural image can be obtained after decoding.

A more suitable quantization coefficient can be calculated by adjusting the number of quantization circuits and the number of code length calculation circuits. The quantization coefficients for obtaining the target total bit count may be separately calculated, or all the coefficients may be calculated by, e.g, multiplying a basic quantization table (basic quantization coefficients) shown in FIG. 7 by a predetermined scale factor $\alpha$.

Figure 8:
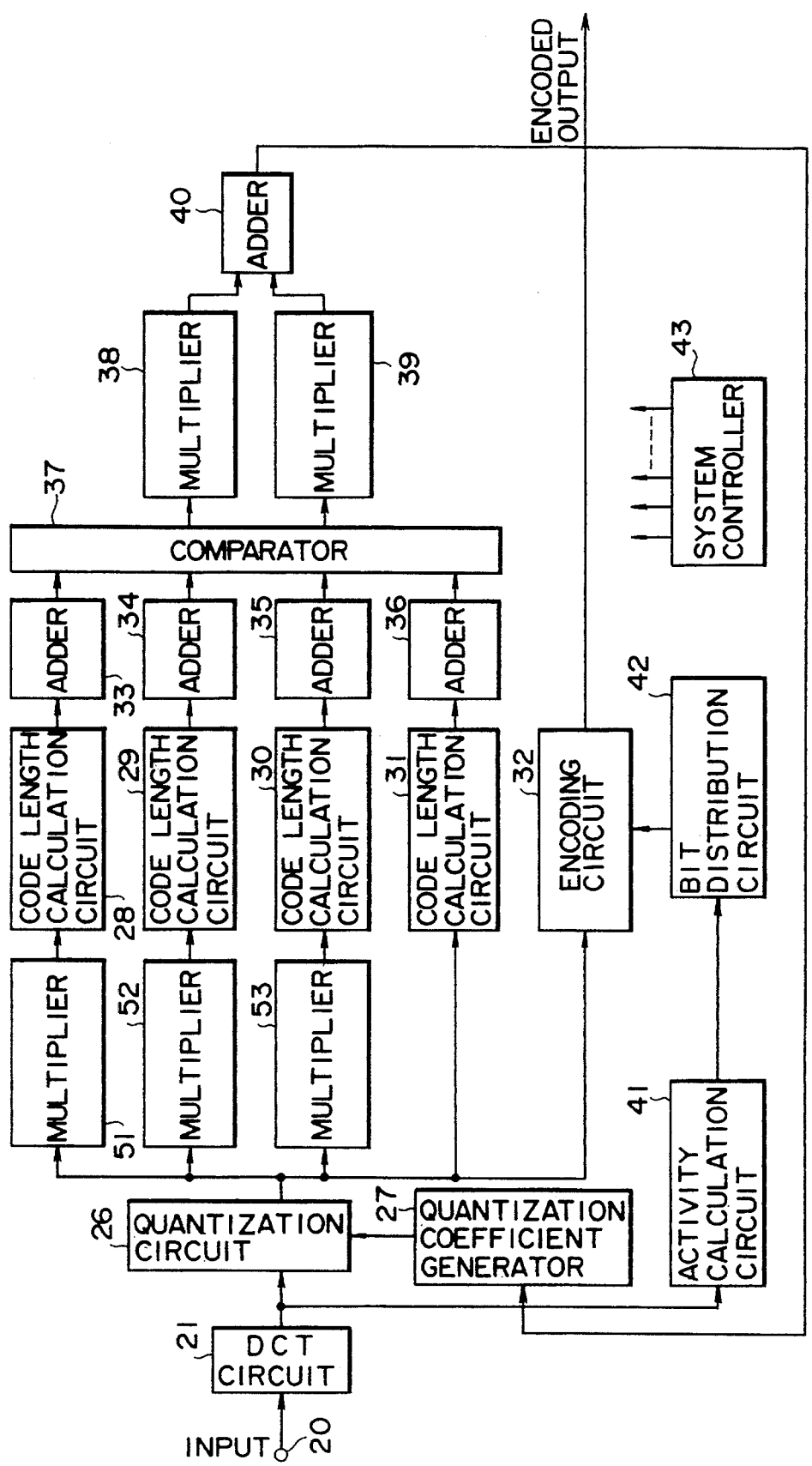
FIG. 8 is a block diagram showing another embodiment of the present invention.

FIG. 8 is a block diagram showing another embodiment of the present invention. In FIG. 8, the same constituent elements as in FIG. 1 are denoted by the same reference numerals, and a detailed description thereof will be omitted.

The embodiment of FIG. 8 is different from that of FIG. 1 in that, in FIG. 8, multipliers 51 to 53 are provided, and the quantization circuits 22 to 25 of FIG. 1 are omitted and a quantization circuit 26 is used also as a quantization circuit for obtaining optimum quantization characteristics. Accordingly, in this embodiment, an optimum quantization characteristic determinator is constituted by the multipliers 51 to 53, code length calculation circuits 28 to 31, adders 33 to 36, a comparator 37, multipliers 38 and 39, and an adder 40.

A DCT coefficient output from a DCT circuit 21 is input to the quantization circuit 26 and an activity calculation circuit 41. An output from the quantization circuit 26 is supplied to the multipliers 51 to 53, and the code length calculation circuit 31 and an encoding circuit 32 directly. The multipliers 51 to 53 multiply the quantization output by different predetermined coefficients, and supply the obtained products to the code length calculation circuits 28 to 30.

In this embodiment, the code lengths of four different quantization outputs are obtained by the code length calculation circuits 28 to 31. The respective code lengths are supplied to the adders 33 to 36. The adders 33 to 36, the comparator 37, the multipliers 38 and 39, and the adder 40 perform operations to output a determination signal of the optimum quantization coefficient, i.e., an optimum scale factor $\alpha_t$ in the same manner as in the embodiment of FIG. 1. The scale factor $\alpha_t$ is obtained during the first scanning period. In the second scanning operation, a quantization coefficient generator 27 outputs a quantization coefficient in accordance with the determination signal.

The multipliers 51 to 53 shown in this embodiment can be substituted by bit shift circuits.

Figure 9:
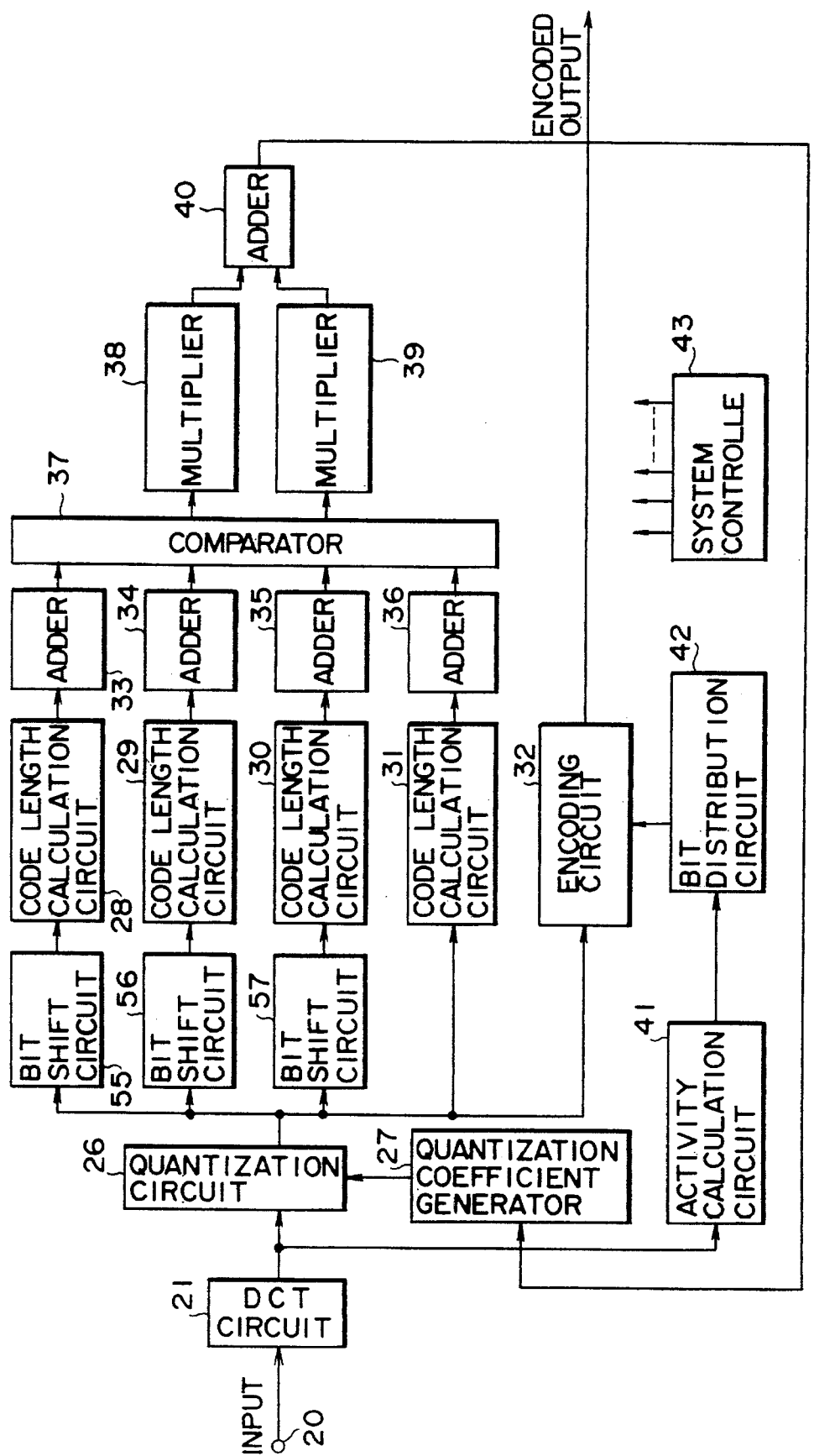
FIG. 9 is a block diagram showing still another embodiment of the present invention.

FIG. 9 shows an arrangement in which the multipliers 51 to 53 are substituted by bit shift circuits 55, 56, and 57. The bit shift circuits 55, 56, and 57 shift an output from a quantization circuit 26 by 3 bits, 2 bits, and 1 bit, respectively, and output shifted outputs. More specifically, the quantization output is multiplied by ⅛, ¼, and ½, respectively, by the bit shift circuits 55, 56, and 57. The obtained quantization outputs are equivalent to the quantization outputs obtained by multiplying the basic quantization coefficient from the quantization coefficient generator 27 by 8, 4, and 3, respectively.

FIG. 10 shows still another embodiment of the present invention. The same constituent elements as in the embodiment of FIG. 1 are denoted by the same reference numerals. Accordingly, elements different from the embodiment of FIG. 1 will be described. In this embodiment, when optimum quantization characteristics are to be determined in the first scanning period, a plurality of different quantization coefficients are supplied to a quantization circuit 26 in a time-division manner. The code lengths based on the different quantization coefficients are accumulated by corresponding adders 33 to 36. Outputs from the adders 33 to 36 are multiplied by, e.g., 4, and input to a comparator 37. Thereafter, a scale factor $\alpha_t$ is calculated in the same manner as in the embodiment of FIG. 9. Therefore, in this embodiment, a code length calculation circuit 60, the adders 33 to 36, the comparator 37, multipliers 38 and 39, and an adder 40 constitute an optimum quantization characteristic determinator.

The detailed arrangement of this embodiment will be described. A DCT coefficient from a DCT circuit 21 is supplied to the quantization circuit 26. A quantization coefficient is supplied to the quantization circuit 26 from a quantization coefficient generator 27. A quantization output from the quantization circuit 26 is output to the code length calculation circuit 60 and to an encoding circuit 32. An output from the code length calculation circuit 60 is supplied to the adders 33 to In this embodiment, a plurality of quantization outputs quantized by different quantization coefficients are supplied to the code length calculation circuit 60 in the time-division manner. The quantization coefficient generator 27 can switch the quantization coefficients to be supplied to the quantization circuit 26 in units of blocks. More specifically, the quantization coefficient generator 27 can output, e.g., quantization coefficients $Q_0$ to $Q_3$ in a predetermined order or can randomly, selectively output them in units of blocks.

FIG. 11 is a table for explaining the operation of this embodiment. The output from the DCT circuit 21 is read out in units of blocks and supplied to the quantization circuit 26. More specifically, blocks are sequentially read out from the DCT circuit 21 starting from the blocks on the uppermost portion (to be referred to as a first block line hereinafter) of the frame horizontally. Thereafter, blocks on the second line (to be referred to as a second block line hereinafter) are sequentially horizontally read out. The respective block lines are read out in the same manner. FIG. 11 shows quantization coefficients corresponding to the horizontal and vertical blocks constituting one frame. As shown in FIG. 11, the quantization coefficient generator 27 alternately supplies the quantization coefficients $Q_0$ and $Q_1$ to the quantization circuit 26 in the block line of an odd number, and the quantization coefficients $Q_2$ and $Q_3$ to the quantization circuit 26 in the block line of an even number. The quantization circuit 26 quantizes the DCT coefficient based on the quantization coefficient supplied thereto, and supplies a quantization output to the code length calculation circuit 60. The code length calculation circuit 60 obtains code lengths obtained by encoding the quantization outputs in accordance with, e.g., Haffman coding, and selectively outputs the code lengths to the adders 33 to 36 in units of blocks. The code length calculation circuit 60 supplies the code length of a quantization output corresponding to the quantization coefficient $Q_0$ to the adder 33, the code length of a quantization output corresponding to the quantization coefficient $Q_1$ to the adder 34, the code length of a quantization output corresponding to the quantization coefficient $Q_2$ to the adder 35, and the code length of a quantization output corresponding to the quantization coefficient $Q_3$ to the adder 36. Each of the adders 33 to 36 obtains the calculated total bit count by accumulating the code length corresponding to one frame, and supplies it to the comparator 37.

The operations of the comparator 37, the multipliers 38 and 39, and the adder 40 are the same as those of the embodiment of FIG. 1. In the embodiment of FIG. 10, the block counts of one frame corresponding to the quantization coefficients $Q_0$ to $Q_3$ are ¼ the total block count of one frame. Hence, when the total bit counts $NB_0$ to $NB_3$ shown in FIG. 6 are to be calculated, the outputs from the adders 33 to 36 are multiplied by 4.

In this embodiment, the same effect as that of FIG. 1 can be obtained. In FIG. 11, the quantization coefficient generator 27 sequentially outputs the quantization coefficients $Q_0$ to $Q_3$. However, it is sometimes preferable to output the quantization coefficients $Q_0$ to $Q_3$ randomly. In this case, the numbers of times that the quantization coefficients $Q_0$ to $Q_3$ are supplied to the quantization circuit 26 are also random. Therefore, the number of output times of the respective quantization coefficients may be counted during a predetermined period of time, the numbers of output times of the respective quantization coefficients corresponding to one frame may be estimated from these counts, and coefficients corresponding to the estimated numbers of output times may be multiplied by the outputs from the adders 33 to 36.

Figure 12:
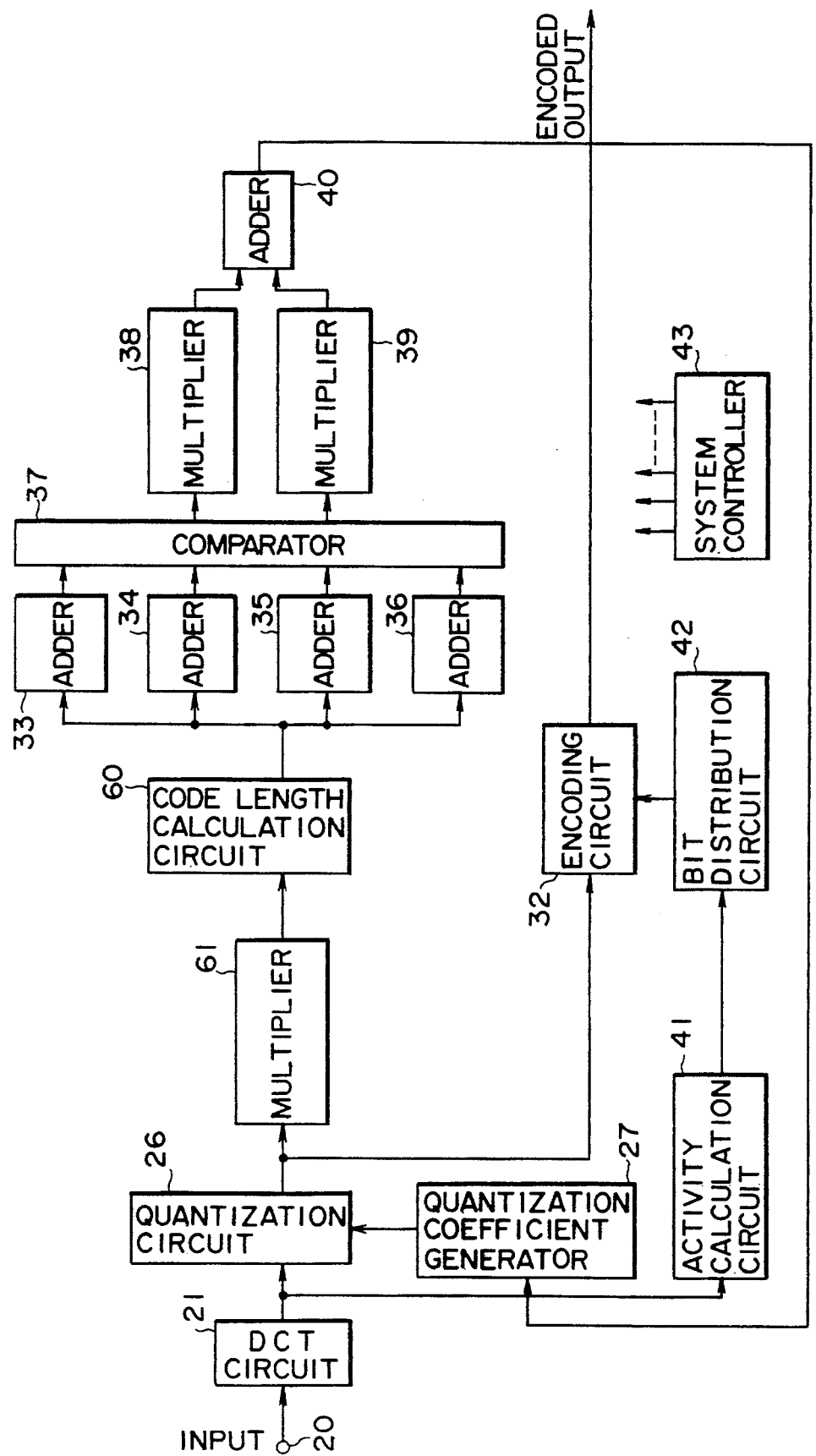
FIG. 12 is a block diagram showing still another embodiment of the present invention.

FIG. 12 shows still another embodiment of the present invention. The embodiment of FIG. 12 is different from that of FIG. 10 in that a multiplier 61 is provided between a quantization circuit 26 and a code length calculation circuit 60. In this embodiment, a quantization coefficient from a quantization coefficient generator 27 does not change throughout a one-frame period even in the first scanning operation. Instead, the multiplier 61 multiplies the quantization output by different coefficients in units of blocks and outputs the results.

For example, in a block line of an odd number, the multiplier 61 directly outputs a quantization output of a block of an odd number in the horizontal direction, and multiplies a quantization output of a block of an even number in the horizontal direction by a coefficient $\alpha_1$ and outputs the product. In a block line of an even number, the multiplier 61 multiplies a quantization output of a block of an odd number in the horizontal direction by a coefficient $\alpha_2$ and outputs the product, and multiplies a quantization output of a block of an even number in the horizontal direction by a coefficient $\alpha_3$ and outputs the product.

The operation of this embodiment will be described. When a quantization output is directly output from the multiplier 61, its code length is calculated by the code length calculation circuit 60, and the obtained code length is input to an adder 33. When a quantization output is multiplied by the multiplier 61 by the coefficient $\alpha_1$, its code length is calculated by the code length calculation circuit 60, and the obtained code length is input to an adder 34. When a quantization output is multiplied by the multiplier 61 by the coefficient $\alpha_2$, its code length is calculated by the code length calculation circuit 60, and the obtained code length is input to an adder 35. When a quantization output is multiplied by the multiplier 61 by the coefficient $\alpha_3$, its code length is calculated by the code length calculation circuit 60, and the obtained code length is input to an adder 36. Each of the adders 33 to 36 adds a code length corresponding to one frame to the respective code lengths, and supplies the calculated total bit count as each sum to a comparator 37. The operations of the comparator 37, multipliers 38 and 39, and an adder 40 are the same as those of the embodiment shown in FIG. 10. A scale factor $\alpha_t$ for obtaining the optimum quantization characteristics is obtained by the adder 40.

As described above, when the quantization circuit 26 performs quantization based on a quantization coefficient, the quantization output sometimes exceeds a target total bit count. For this reason, the total bit count corresponding to one frame of the output from an encoding circuit 32 is limited by an activity calculation circuit 41 and a bit distribution circuit 42.

For this purpose, the activity calculation circuit 41 calculates a sum Acb (block activity) of the DCT coefficients in each block, a sum Act (=dAcb) of the DCT coefficients of all the blocks, and their ratio Acb/Act. Then, the activity calculation circuit 41 calculates a bit distribution amount (block bit count) Bb of each block. Bb can be obtained in accordance with following equation (4):

$$Bb=(Acb/Act)B_T \qquad (4)$$

where $B_T$ is the target total bit count (target code length).

The multiplier 61 can be substituted by a bit shift circuit.

Figure 13:
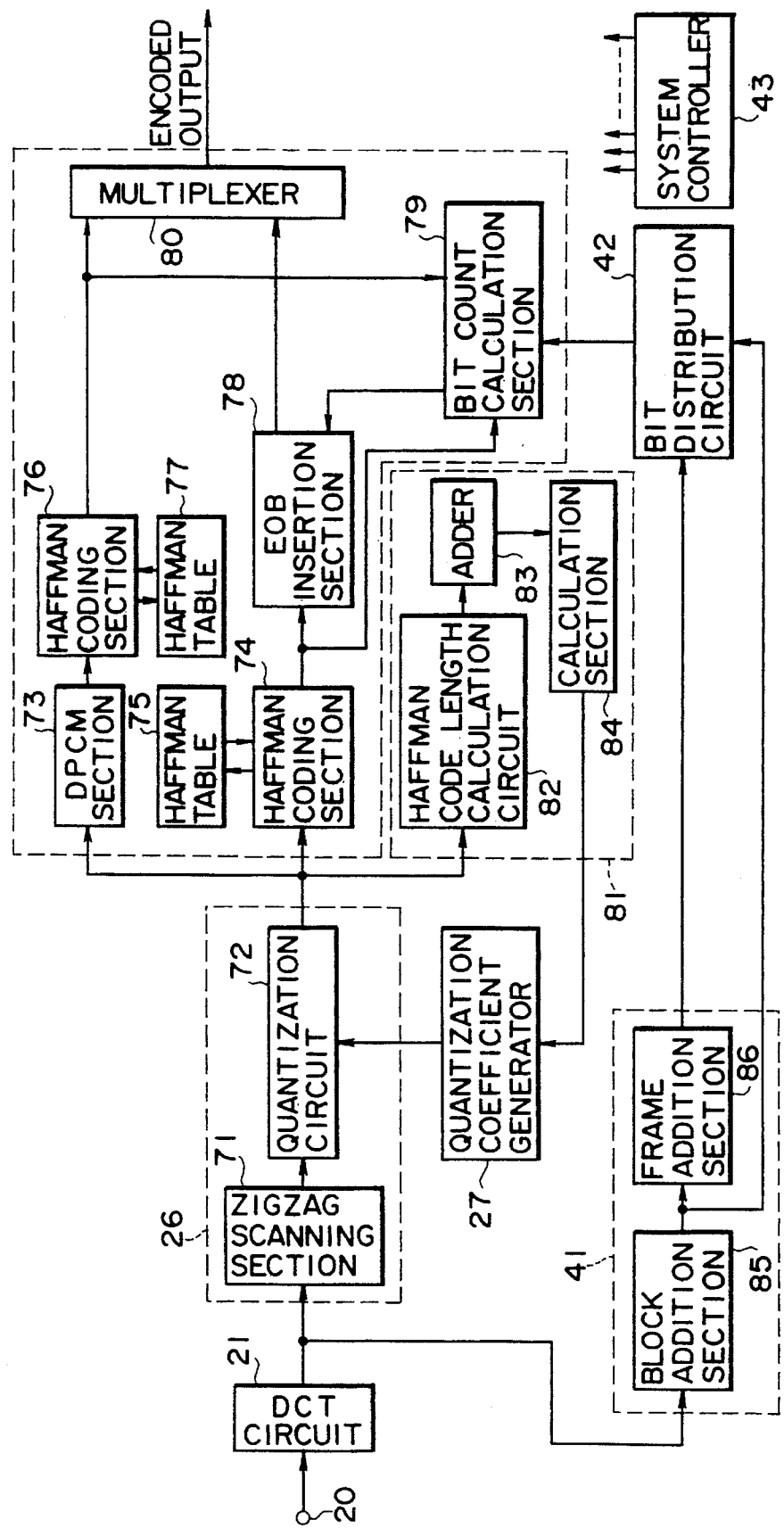
FIG. 13 is a block diagram showing still another embodiment of the present invention.

FIG. 13 shows the encoding circuit 32 of the embodiment of FIG. 12 in more detail.

An output from the DCT circuit 21 is input to a zigzag scanning section 71 partly constituting the quantization circuit 26, and to a block adding section 85 partly constituting the activity calculation circuit 41. An output from the zigzag scanning section 71 is input to a quantization section 72 to be quantized. Of the quantization output from the quantization circuit 26, the DC term is input to a DPCM section 73, and the AC term is input to a Haffman coding section 74 and an optimum quantization characteristic determinator 81. The DPCM section 73 (DPCM: differential pulse code modulation) calculates the difference between the DC terms of adjacent blocks, and supplies the result to a Halfman coding section 76. The Haffman coding section 76 encodes an output from the DPCM section 73 in accordance with Haffman coding by using a Haffman table 77, and inputs the result to a multiplexer 80. The Halfman coding section 74 encodes the combination of the 0 run of the quantization output and the bit length of the quantization coefficient in accordance with Haffman coding by using a Haffman table 75, and supplies the result to an EOB insertion section 78 (EOB: End Of Block) and a bit count calculation section 79. The EOB insertion section 78 adds an EOB code representing an end of block to the end of the block output from the Haffman coding section 74, and inputs the result to the multiplexer 80. The multiplexer 80 mixes the outputs from the Haffman coding section 76 and the EOB insertion section 78 in the time-division manner and outputs the result.

The block adding section 85 of the activity calculation circuit 41 calculates the block activity Acb and supplies it to a frame adding section 86 and the bit distribution circuit 42. The bit distribution circuit 42 calculates the bit distribution amount Bb in accordance with Bb=(Acb/Act)$B_T$ and supplies it to the bit count calculation section 79. When the bit count of one block of the output from the Haffman coding section 74 exceeds the bit distribution amount, the bit count calculation section 79 supplies a signal representing it to the EOB insertion section 78. Then, the EOB insertion section 78 inserts an EOB code representing an end of block in the encoded output and outputs the result. Therefore, the remaining quantization coefficients in the given block are not encoded, and encoding of a subsequent block is started. In this case, the bit count calculation section 79 manages the entire bit count, including the output bit count of the Halfman coding section 76 and the bit count of the EOB code, to be within the bit distribution. Except that, the arrangement of FIG. 13 is identical to that of the embodiment of FIG. 12.

In this embodiment, the interior of the optimum quantization characteristic determinator 81 is illustrated as a block including a Haffman code length calculation section 82, an adder 83, and a calculation section 84. The Haffman code length calculation section 82 corresponds to the code length calculation circuit 60, the adder 83 corresponds to the adders 33 to 36, and the calculation section 84 corresponds to the comparator 37, the multipliers 38 and 39, and the adder 40.

FIG. 14 shows still another embodiment of the present invention.

In this embodiment, when optimum quantization characteristics are to be determined, a plurality of quantization outputs quantized by a plurality of quantization coefficients are not obtained at once, unlike in the embodiment shown in FIG. 1, but a plurality of quantization outputs quantized by a plurality of quantization coefficients are obtained in the time-division manner. Furthermore, an optimum quantization characteristic determinator 81 and an encoding circuit 32 are not provided parallel to each other, unlike in the embodiment of FIGS. 12 and 13, but the output from the encoding circuit 32 is utilized as an input signal to the optimum quantization characteristic determinator 81. Then, the encoding circuit 32 is also utilized as an element for determining the optimum quantization characteristics.

In this embodiment, in order to shorten the determination time of the optimum quantization characteristics, for example, blocks of ¼ the total block count of one frame are assigned as blocks to be quantized.

The same portions as in FIG. 13 are denoted by the same reference numerals. Furthermore, in this embodiment, a system of image data to be input to a DCT circuit 21 is additionally shown. In a quantization circuit 26, a quantization section 91 for the DC term of a DCT coefficient and a quantization section 92 for the AC term of a DCT coefficient are separately shown. Regarding the interior of the encoding circuit 32, when compared to the circuit of FIG. 13, a zigzag scanning section is added, and an EOB insertion section 78 and a bit count calculation section 79 are omitted. In fact, this circuit configuration is the same as that of FIG. 13 except that an activity calculation circuit 41, a bit distribution circuit 42, and the like are omitted. Although the optimum quantization characteristic determinator 81 is indicated as a code length calculation section 94 and an α calculation section 95 for calculating a scale factor α, its function is actually equivalent to that of the circuit of FIG. 12.

In this embodiment, the interior of a quantization coefficient generator 27 is indicated in detail. More specifically, the quantization coefficient generator 27 is constituted by a multiplier 96 and a basic quantization table 97.

Image data (a luminance signal and color difference signals) is stored in a frame memory 17. Image data read out from the frame memory 17 is divided by a block division circuit 19 in units of blocks and input to the DCT circuit 21. An address control circuit 18 controls readout from the frame memory 17 and sequentially supplies only data of every other blocks on the block lines of odd numbers to the DCT circuit 21, as indicated by the hatched portions in FIG. 15. The DCT circuit 21 DCT-processes the blocks each constituted by 8×8 pixels, and supplies a DCT coefficient to the quantization sections 91 and 92. The quantization section 91 quantizes the DC term of the DCT coefficient, and the quantization section 92 quantizes the AC term of the DCT coefficient. The quantization output obtained by the quantization section 91 is supplied to a DPCM section 73 of the encoding circuit 32, and the quantization output obtained by the quantization section 92 is scanned by a zigzag scanning section in the zigzag manner and input to a Haffman coding section 74. Any other arrangement of the interior of the encoding circuit 32 is the same as that described with reference to FIG. 13.

An encoded output obtained by a multiplexer 80 is input to an optimum quantization characteristic determinator 81. During an optimum quantization characteristic determination period, the optimum quantization characteristic determinator 81 outputs, e.g., $\alpha_a=1$, $\alpha_2=0.5$, $\alpha_3=0.25$, and $\alpha_4=0.1$ as scale factors α from its a calculation section 95. For example, the blocks indicated by the hatched portions in FIG. 15 are quantized firstly by quantization coefficients determined by $\alpha_1=1$, secondly by quantization coefficients determined by $\alpha_2=0.5$, thirdly by quantization coefficients determined by $\alpha_3=0.25$, and fourthly by quantization coefficients determined by $\alpha_4=0.1$. In this manner, even when quantization is performed four times by using different quantization coefficients, a time required for quantization is the same as the first scanning period of the embodiment of FIG. 1. This is because blocks of ¼ the total block count of one frame is dealt with. The optimum quantization characteristic determination period and the first scanning period will be dealt with as the identical period hereinafter.

The code length calculation section 94 calculates the code lengths, corresponding to one frame, of the encoded outputs corresponding to the respective scale factors, thus obtaining an optimum scale factor $\alpha_t$ from the obtained code lengths. The method of obtaining the optimum scale factor $\alpha_t$ is the same as that described above used for obtaining the optimum quantization coefficient $Q_x$, as follows:

$$Q_x=Q_1 \cdot (NB_2-NB_T)/(NB_2-NB_1) + Q_2 \cdot (NB_T-NB_1)/(NB_2-NB_1)$$

More specifically, assuming that the calculated code lengths when the scale factors are $\alpha_3$ and $\alpha_4$ are $N_3$ and $N_4$, respectively, that the target code length is $N_T$, and that $N_4 > N_T > N_3$, $$\alpha_t = \alpha_3 \cdot (N_4-N_T)/(N_4-N_3) + \alpha 4 \cdot (N_T-N_3)/(N_4-N_3) \tag{5}$$

During the optimum quantization characteristic determination period, a scale factor α=1 is supplied to the quantization section 92. For example, the blocks of the odd numbers on the block lines of the odd numbers are supplied to the DCT circuit 21 in units of blocks. The encoded output from the encoding circuit 32 is supplied to the code length calculation section 94 to accumulate the code lengths of the respective blocks, thereby obtaining the code length, after encoding, of the blocks corresponding to ¼ the blocks of the entire frame. This code length is multiplied by 4, thereby obtaining a calculated total code length $N_1$ for the entire frame for a case wherein $\alpha_1=1$. Accordingly, the calculated total code length $N_1$ can be obtained within a time about ¼ that required when all the blocks of one frame are encoded. Then, in this system, quantization and encoding using a scale factor $\alpha_2=0.1$ are performed. At this time, the same blocks as those used in the above description are used. In this case, the code length calculation section 94 obtains a calculated total code length $N_2$. Then, in this system, quantization and encoding using a scale factor $\alpha_3=0.5$ are performed. At this time, the same blocks as those used in the above description are used. In this case, the code length calculation section 94 obtains a calculated total code length $N_3$. Then, in this system, quantization and encoding using a scale factor $\alpha_4=0.25$ are performed. At this time, the same blocks as those used in the above description are used. In this case, the code length calculation section 94 obtains a calculated total code length $N_4$.

If the target total code length $N_T$ satisfies $N_4>N_T>N_3$, the operation using the above equation is performed by the $\alpha$ calculation section 95, and the optimum scale factor $\alpha_t$ is calculated.

Then, quantization and encoding using this optimum scale factor $\alpha_t$ is performed (second scanning operation). At this time, all the data are read out from the frame memory 17, and the block division circuit 19 divides these data into blocks. At this time, the multiplier of the quantization coefficient generator 27 multiplies the quantization output of the basic quantization table 97 by $\alpha_t$ and outputs the product. FIG. 7 shows quantization coefficients obtained in this case. The quantization section 92 divides the DCT coefficient by a corresponding quantization coefficient and outputs the obtained quotient as the quantization output. This quantization output is encoded in accordance with Haffman coding and supplied to the multiplexer 80.

In the above description, as the blocks used for determining the optimum quantization characteristics, the blocks indicated by the hatched portions shown in FIG. 15 are used four times. However, blocks at different locations may be used instead. For example, blocks of odd numbers on the block lines of the odd numbers may be used, blocks of the even numbers on the block lines of the odd numbers may be used, and then blocks of the even numbers on the block lines of even numbers may be used. When the blocks on the same locations are used, data read control for the frame memory 17 by the address control circuit 18 becomes easier.

In this embodiment, when the code amount (code length) is to be estimated (during the optimum quantization characteristic determination period), quantization and encoding are performed a plurality of times while changing the scale factor $\alpha$ for the blocks corresponding to ¼ the block count of the entire frame, thereby obtaining a plurality of code lengths. Each of the plurality of code lengths is multiplied by 4 to provide the plurality of calculated total code lengths $N_1$ to $N_4$. Therefore, a time corresponding to ¼ that required when the optimum scale factor $\alpha_t$ is calculated by performing quantization and encoding of all the blocks by using four scale factors required for obtaining the optimum scale factor $\alpha_t$ is sufficient.

In this embodiment, the calculated total code length is obtained by reading out blocks corresponding to ¼ the block count of the entire frame. However, arbitrary block data of, e.g., ½ or ⅛ the entire frame may be read out. For example, when the calculated total code length of the first time is to be obtained, blocks corresponding to ⅛ the block count of the entire frame may be used, and when the calculated total code length of the second time is to be obtained, blocks corresponding to ¼ the block count of the entire frame may be used. That is, when the code length is to be estimated, the calculated total code length may be obtained at first by coarse block sampling, and the calculated total code lengths may be gradually obtained in accordance with fine block sampling, thereby performing quick and accurate code length estimation. The sampling positions may be regular as shown in FIG. 15, shifted, or random. In this embodiment, quantization and encoding are performed four times in order to estimate the code length. However, the number of encoding times can be arbitrarily set.

In this case, encoding may be repeated while changing the scale factor a until an allowance $|N_T-N_n|$ between the target total code length $N_T$ and a calculated code length $N_n$ becomes smaller than a predetermined value nb, thereby calculating the optimum scale factor $\alpha_t$.

When a calculated code length is to be obtained, for example, when blocks corresponding to ⅛ the block count of the entire frame are dealt with first, and a plurality of different encoded outputs are obtained by using different quantization coefficients, a calculated code length close to the target code length can sometimes be detected without performing quantization eight times. In this case, the optimum scale factor can be obtained at a very early period.

This embodiment is based on an assumption that the relationship between the code length and the scale factor $\alpha$ is linear. In fact, however, the relationship between them is not linear. In FIG. 16, the axis of abscissa represents the logarithm of the scale factor $\alpha$, and the axis of the ordinate represents the logarithm of the total code length N to indicate the relationship between the code length and the scale factor.

For example, when the relationship between the logarithm of the scale factor $\alpha$ and the logarithm of the total code length N of predetermined images A and B are obtained, the relationship is linear, as shown in FIG. 16. According to the evaluation results of many images, the relationship between the logarithm of the scale factor $\alpha$ and the logarithm of the total code length N is as shown in FIG. 16, that is, establishes the following equation:

$$logN = K1 log\alpha + K2 \qquad (6)$$

where K1 and K2 are constants.

The a calculation section 95 may calculate the optimum scale factor $\alpha_t$ by using this equation. More specifically, the a calculation section 95 calculates K1 and K2 by using $N_3$, $N_4$, $\alpha_3$, and $\alpha_4$ described above, and calculates the optimum scale factor $\alpha_t$ from the target total code length $N_T$. When the above equation is employed, a more accurate scale factor $\alpha_t$ can be obtained.

In this case, calculation is based on an assumption that the scale factor $\alpha$ used for estimating the code length corresponds to a logarithm. More specifically, in the above description, the scale factor $\alpha$ is changed to 1, 0.1, 0.5, and 0.25. However, since logN and log$\alpha$ are proportional to each other, it is better to change the scale factor $\alpha$ to 0.126, 0.316, and 0.178 so that the corresponding logarithms become 1.2.

Figure 17:
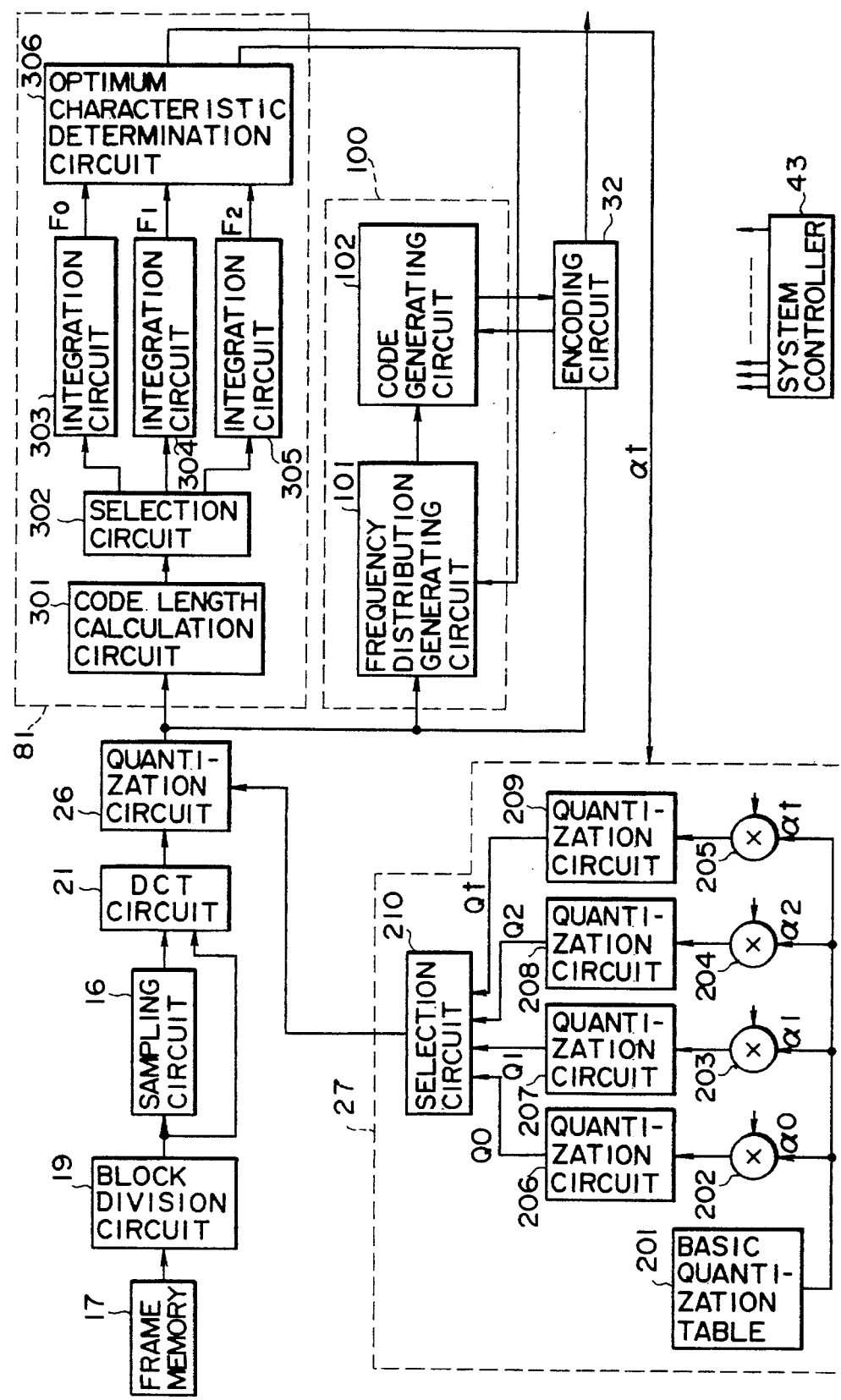
FIG. 17 is a block diagram showing still another embodiment of the present invention.

FIG. 17 shows still another embodiment of the present invention.

In this embodiment, an output from a block division circuit 19 is input to a sampling circuit 16 and directly to a DCT circuit 21 simultaneously. During a period for determining optimum quantization characteristics, optimum quantization, and optimum quantization characteristics, the DCT circuit 21 selects block data interlaced by the sampling circuit 16 in order to obtain a determination result within the first scanning period. After optimum quantization and encoding characteristics are determined, when original processing is to be performed, the output from the block division circuit 19 is directly selected.

In this embodiment, the arrangement of a quantization coefficient generator 27 is described in detail, and an encoding characteristic control circuit 100 corresponding to the encoding circuit 32 is provided.

This embodiment is based on a finding that the quantization coefficient output from the quantization coefficient generator 27 and the Haffman code (variable length code) used by the encoding circuit 32 are related to each other and respectively influence the output total bit count. This is because the output bit count also changes by correcting the data base of the variable length code. Furthermore, in this embodiment, the time period required for determining the optimum quantization characteristics and the time period required for determining the optimum encoding characteristics are considered, so that the optimum quantization and encoding characteristics (that is, image compression characteristics) can be determined within a short period of time.

In this embodiment, different quantization coefficients are switched during the first scanning 10 period (a time required for scanning the entire frame once), thereby obtaining the optimum quantization and encoding characteristics. Different quantization coefficients $Q_0$ to $Q_t$ are obtained by the quantization coefficient generator 27. The quantization coefficient generator 27 has a basic quantization table 201, and the basic quantization coefficient output from a basic quantization table 201 is supplied to multipliers 202 to 205. In the respective multipliers 202 to 205, the basic quantization coefficient is multiplied by coefficients $\alpha_0$, $\alpha_1$, $\alpha_2$, and $\alpha_t$, and the obtained quantization coefficients $Q_0$, $Q_1$, $Q_2$, and $Q_t$ are stored in corresponding quantization tables 206 to 209.

A selection circuit 210 selects the quantization coefficient $Q_0$ from the quantization table 206 first. In this case, the DCT circuit 21 processes the block data sampled by the sampling circuit 16 in accordance with DCT processing. A quantization circuit 26 quantizes the DCT coefficient by using the quantization coefficient $Q_0$ and supplies the quantization output to a code length calculation circuit 301. The code length calculation circuit 301 calculates a code length obtained when the quantization output is subjected to variable length encoding and supplies it to an integration circuit 303 through a selection circuit 302. The integration circuit 303 integrates the code lengths of the respective blocks obtained by the code length 10 calculation circuit 301, thereby obtaining a calculated total bit length $F_0$ corresponding to one frame.

Then, the selection circuit 210 selects the quantization coefficient $Q_1$ output from the quantization table 207. The quantization circuit 26 quantizes the DCT coefficient by using the quantization coefficient $Q_1$. The code length calculation circuit 301 calculates the code length obtained when the quantization output is subjected to variable length encoding, and supplies it to an integration circuit 304 through the selection circuit 302. The integration circuit 304 integrates the code lengths of the respective blocks obtained by the code length calculation circuit 301, thereby obtaining a calculated total bit length F1 corresponding to one frame.

Then, the selection circuit 210 selects the quantization coefficient $Q_2$ output from the quantization table 208. The quantization circuit 26 quantizes the DCT coefficient by using the quantization coefficient $Q_2$. The code length calculation circuit 301 calculates the code length obtained when the quantization output is subjected to variable length encoding, and supplies it to an integration circuit 305 through the selection circuit 302. The integration circuit 305 integrates the code lengths of the respective blocks obtained by the code length calculation circuit 301, thereby obtaining the calculated total bit length $F_2$ corresponding to one frame.

The calculated total bit lengths $F_0$ to $F_2$ output from the integration circuits 303 to 305 are input to an optimum characteristic determination circuit 306. The optimum characteristic determination circuit 306 detects, from the plurality of calculated total bit lengths, $F_i$ and $F_{i+1}$ satisfying $F_i < F_t < F_{i+1}$ (i =0, 1) where $F_t$ is the target total bit length.

Then, a scale factor $\alpha_t$ for obtaining the optimum quantization characteristics is calculated.

Figure 18:
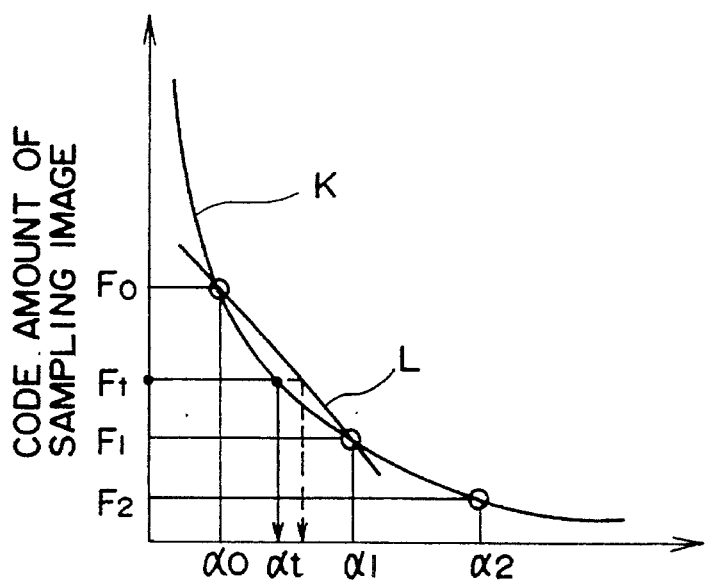
FIG. 18 is a graph showing a scale factor and a total code length for explaining the embodiment of FIG. 17, FIGS. 19A to 19C are views of scale factors for explaining the embodiment of FIG. 17.

FIG. 18 shows the relationship between the scale factor (coefficients supplied to the multipliers 202 to 205) and the code length. The axis of abscissa represents the scale factor, and the axis of ordinate represents the total bit length obtained when the sampling block is quantized and encoded. As is apparent from this characteristic curve, when the scale factor is increased, the total bit length is decreased; when the scale factor is decreased, the total bit count is increased.

Assuming that $F_i = F_0$ and $F_{i+1} = F_1$, the scale factor $\alpha_t$ for obtaining the optimum quantization characteristics exists between $\alpha_0$ and $\alpha_1$. When $\alpha_t$ is to be obtained, it can be obtained in the same manner as in the above embodiment in accordance with equations (3) and (5). However, as shown in FIG. 18, since the relationship between the scale factor and the total bit length actually becomes a curve K and is thus not linear, like a straight line L, $\alpha_t$ is an approximate value.

The scale factor $\alpha_t$ is supplied to the multiplier 205, and $\alpha_t$ is multiplied by the basic quantization coefficient, so that an optimum quantization coefficient $Q_t$ is obtained and stored in the quantization table 209. In the subsequent second scanning period, original quantization is performed by using the quantization coefficient $Q_t$.

In this embodiment, however, when original quantization is to be performed, the optimum encoding characteristics of the encoding circuit 32 are determined by the encoding characteristic control circuit 100. When a quantization output is encoded, the encoded output sometimes exceeds the target total bit length. The optimum encoding characteristics are determined in order to prevent this. The encoded output exceeds the target total bit length because the scale factor $\alpha_t$ can be obtained only approximately, as described with reference to FIG. 18.

The encoding characteristic control circuit 100 is constituted by a frequency distribution generating circuit 101 for receiving an output from the quantization circuit 26, and a code generating circuit 102 for changing the code table generated by the output from the frequency distribution generating circuit 101. The frequency distribution generating circuit 101 has an address generator. The address generator generates a value (to be referred to as an address hereinafter), to which a variable length code corresponding to the quantization output is to be assigned, on the basis of the quantization output. The data generation frequency distribution can be obtained by using this address. The data generation frequency distribution is supplied to the code generating circuit 102. The code table generated by the code generating circuit 102 is stored in the Haffman table in the code generating circuit 102.

During the first scanning period (optimum quantization characteristic determination period), the frequency distribution generating circuit 101 detects data generation frequency distributions $FD_0$, $FD_1$, and $FD_2$ by using quantization outputs $QD_0$, $QD_1$, and $QD_2$ corresponding to the scale factors $\alpha_0$ to $\alpha_2$. The optimum characteristic determination circuit 306 supplies $\alpha_i$ and $\alpha_{i+1}$, used for obtaining the optimum scale factor $\alpha_t$, to the frequency distribution generating circuit 101. If i=0, the data generation frequency distributions $FD_0$ and $FD_1$ are utilized. The data generation frequency distributions $FD_0$ and $FD_1$ should close to a data generation frequency distribution $FD_t$ of the quantization output obtained when the scale factor $\alpha_t$ is used.

Figures 19A, 19B:
Figure 19C:
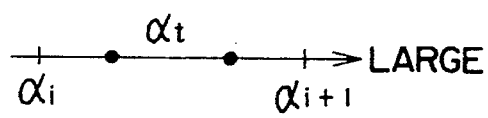

In the second scanning operation, selection of a code table is performed as follows by using the data generation frequency distributions $FD_0$ and $FD_1$. More specifically, the scale factor $\alpha_t$ is obtained by the optimum characteristic determination circuit 306. The optimum characteristic determination circuit 306 supplies size relationship information concerning the scale factors $\alpha_t$, $\alpha_i$, and $\alpha_{i+1}$ as well to the frequency distribution generating circuit 101. As shown in FIG. 19A, when the difference between the scale factors $\alpha_t$ and $\alpha_i$ is very small, the frequency distribution generating circuit 101 supplies the data generation frequency distribution $FD_i$, obtained when the scale factor $\alpha_i$ is used, to the code generating circuit 102. Then, selection of the code table is performed, and the selected code table is set in the encoding circuit 32. As shown in FIG. 19B, when the difference between the scale factors $\alpha_t$ and $\alpha_{i+1}$ is very small, the frequency distribution generating circuit 101 supplies the data generation frequency distribution $FD_{i+1}$, obtained when the scale factor $\alpha_{i+1}$ is used, to the code generating circuit 102. Then, selection of the code table is performed, and the selected code table is set in the encoding circuit 32. As shown in FIG. 19C, when the difference between the scale factors $\alpha_t$ and $\alpha_i$ and the difference between the scale factors $\alpha_t$ and $\alpha_{i+1}$ are almost equal to each other, the frequency distribution generating circuit 101 supplies the data generation frequency distributions $FD_i$ and $FD_{i+1}$, obtained when the scale factors $\alpha_t$ and $\alpha_{i+1}$ are used, to the code generating circuit 102. The code generating circuit 102 forms a code table based on the input data generation frequency distributions and supplies it to the encoding circuit 32. The code table is a table of a variable length code, e.g., the Haffman code.

As described above, when variable length encoding is performed, if the data generation frequency distribution based on the optimum scale factor is obtained in the first scanning period for each image to be processed, and the table of the variable length code is corrected in accordance with this frequency distribution, optimum variable length encoding is enabled in the second scanning operation. Then, the encoding efficiency is improved. Also, excess of a target total bit length (target code amount) caused by an error in determining the quantization characteristics can be suppressed.

Figure 20:
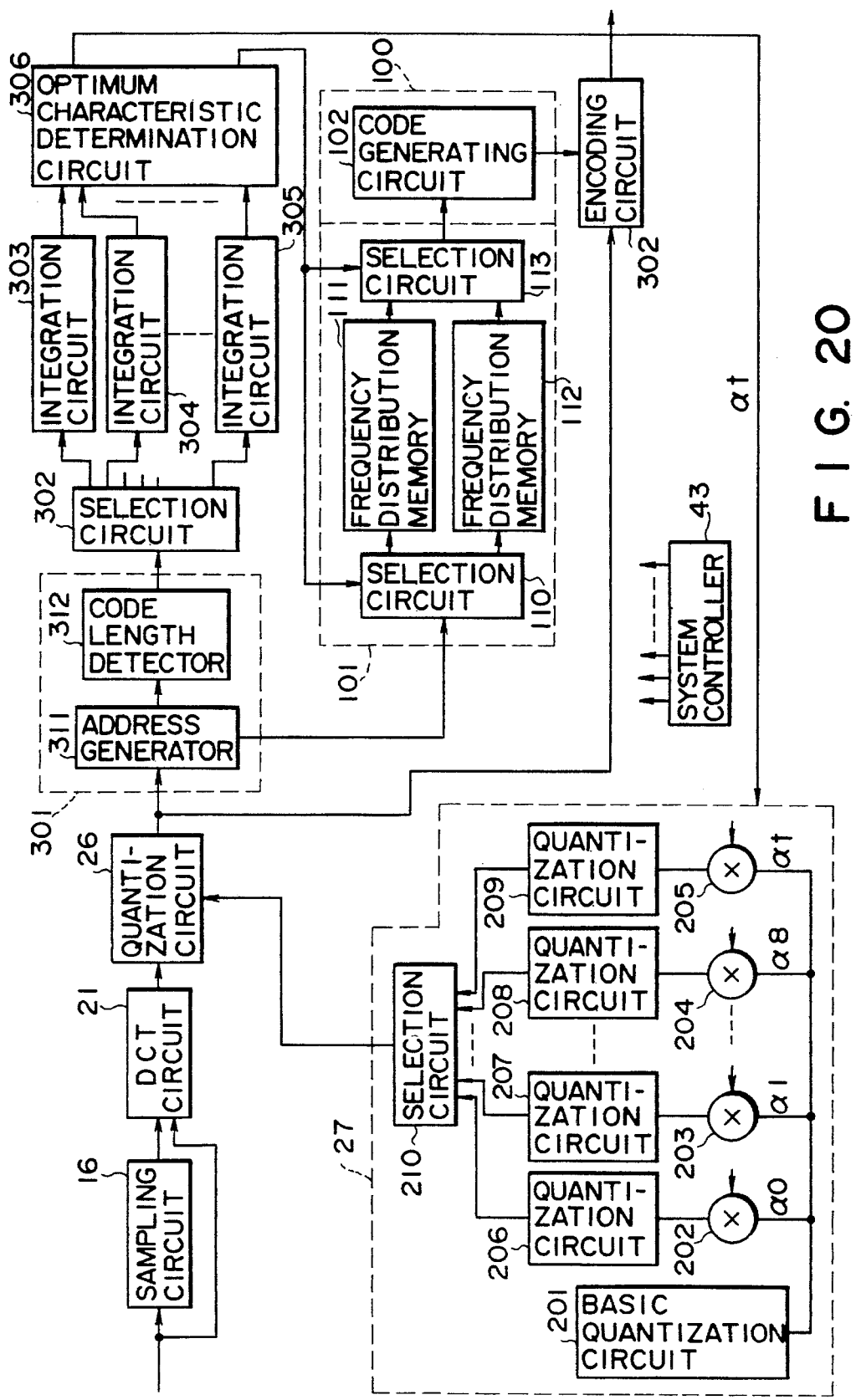
FIG. 20 is a block diagram showing still another embodiment of the present invention.

FIG. 20 shows still another embodiment of the present invention. The same functional portions as in the embodiment shown in FIG. 17 are denoted by the same reference numerals. In the embodiment of FIG. 17, the frequency distribution generating circuit 101 also has an address generator, and this address generator generates an address (a value to which a code is assigned) of a code based on the quantization output, and a frequency distribution based on this address is obtained. However, in the embodiment of FIG. 20, an address generator 311 provided in a code length calculation circuit 301 is also used as the address generator of a frequency distribution generating circuit 101.

More specifically, a quantization output from a quantization circuit 26 is input to the address generator 311 of the code length calculation circuit 301. The address generator 311 generates a value (an address corresponding to a code) to which a code is to be assigned based on the quantization output. This address is input to a code length detector 312. The code length detector 312 detects a code length (data) corresponding to the address. This code length is input to one of integration circuits 303 to 305 through a selection circuit 302. The address output from the address generator 311 is also input to a selection circuit 110 partly constituting the frequency distribution generating circuit 101. The selection circuit 110 inputs the input address to a frequency distribution memory 111 or 112 based on a selection control signal supplied from a optimum characteristic determination circuit 306. The frequency distribution memories 111 and 112 accumulate data at a position designated by the input address. Then, the data generation frequency distribution is formed in the frequency distribution memory 111 or 112.

One or both of the frequency distribution memory 111 and 112 are selected by a selection circuit 113, and information on the frequency distribution formed in one or both of the selected frequency distribution memories 111 and 112 is supplied to a code generating circuit 102.

Assume that quantization tables 206 to 208 capable of setting nine different quantization characteristics are prepared in the quantization coefficient generator 27. A quantization table 209 is a table for storing the optimum quantization coefficient. Thus, in this embodiment, actually nine integration circuits (303 to 30.5) exist.

During the optimum quantization characteristic determination period for determining the optimum quantization characteristics, scale factors $\alpha_0$ to $\alpha_8$ are sequentially output from the quantization coefficient generator 27. The code lengths of the quantization outputs corresponding to the respective scale factors $\alpha_0$ to $\alpha_8$ are accumulated in the integration circuits 303 to 305. The optimum characteristic determination circuit 306 detects two calculated total bit lengths close to the target total bit length by using outputs (calculated total bit lengths) from the integration circuits 303 to 305, and obtains an optimum scale factor $\alpha_t$ based on the two calculated total bit lengths. The optimum scale factor $\alpha_t$ is used as the multiplier of a multiplier 205. The multiplier 205 multiplies the quantization coefficient of the basic quantization table by $\alpha_t$ to generate an optimum quantization coefficient, and stores it in the quantization table 209. In the second scanning operation, the quantization coefficient of the quantization table 209 is used.

The efficiency of determining the optimum quantization characteristics will be described.

In this embodiment, the optimum characteristic determination circuit 306 determines the optimum characteristics, and has a scale factor control program for the quantization coefficient generator 27.

During the optimum quantization determination period, the code lengths of the blocks quantized by different scale factors are accumulated in the integration circuits 303 to 305. Thus, when a selection circuit 210 of the quantization coefficient generator 27 is to be controlled, it is controlled in the following manner. Assume that the scale factors $\alpha_0$ to $\alpha_8$ satisfy a relationship as shown in FIG. 21, with $\alpha_1$ being the smallest and $\alpha_8$ being the largest, and that the optimum scale factor $\alpha_t$ is located at a position to satisfy $\alpha_1 < \alpha_t < \alpha_2$.

During the optimum quantization characteristics determination period, assume that the selection circuit 210 is controlled first, and that a quantization coefficient corresponding to the scale factor $\alpha_4$ ($\alpha_0$ to $\alpha_8$) is used. Then, a code length is accumulated in an integration circuit corresponding to $\alpha_4$, and the first calculated total bit count becomes apparent. The optimum characteristic determination circuit 306 determines whether a first calculated total bit count $F_4$ is larger or smaller than a target total bit length $F_T$. If $F_4 < F_T$, the optimum characteristic determination circuit 306 then controls the selection circuit 210 so that a quantization coefficient corresponding to $\alpha_2$ which is smaller than $\alpha_4$ is used. Then, a code length is accumulated in an integration circuit corresponding to $\alpha_2$, and a second calculated total bit count $F_2$ becomes apparent. The optimum characteristic determination circuit 306 determines whether the second calculated total bit count $F_2$ is larger or smaller than the target total bit length $F_T$. If $F_2 < F_T$, the optimum characteristic determination circuit 306 controls the selection circuit 210 so that a quantization coefficient corresponding to $\alpha_1$ which is smaller than $\alpha_2$ is used. Then, a code length is accumulated in an integration circuit corresponding to $\alpha_1$, and a third calculated total bit count $F1$ becomes apparent. Then, the optimum characteristic determination circuit 306 determines whether the third calculated total bit count $F_1$ is larger or smaller than the target total bit length $F_T$. If $F_T < F_1$, $\alpha_t$ exists between $\alpha_1$ and $\alpha_2$. Inversely, if $F_T > F_1$, $\alpha_t$ exists between $\alpha_0$ and $\alpha_1$.

As described above, when the calculated total bit count is obtained by using the quantization output corresponding to the central scale factor of $\alpha_0$ to $\alpha_8$ first and then whether the calculated total bit count is larger or smaller than the target total bit count is determined, the position of the scale factor used for determining the optimum quantization characteristics can be determined at an early period. According to this scheme, calculated total bit lengths corresponding to all the scale factors $\alpha_0$ to $\alpha_8$ need not be obtained. Thus, a time required for determining the optimum quantization characteristics can be shorter than that required for scanning the entire frame once.

The operation of an optimum encoding characteristic control circuit 100 will be described.

During the first scanning period, while the optimum scale factor $\alpha_t$ is detected as described above, the frequency distribution generating circuit 101 is controlled in the following manner. First, while the first calculated total bit length corresponding to $\alpha_4$ is calculated, an address generated by an address generator 311 is supplied to the frequency distribution memory 111 through the selection circuit 110. Then, while the second calculated total bit length corresponding to $\alpha_2$ is calculated, an address generated by the address generator 311 is supplied to the frequency distribution memory 112 through the selection circuit 110. Then, while the third calculated total bit length corresponding to $\alpha_1$ is calculated, an address generated by the address generator 311 is supplied to the frequency distribution memory 111 through the selection circuit 110 (the previous frequency distribution data is deleted).

Then, piece of information on the frequency distributions of the quantization outputs corresponding to $\alpha_1$ and $\alpha_2$ are accumulated in the frequency distribution memory 111 and 112. In the following processing operation, as described in the description of FIG. 17, one or both of the frequency distributions are supplied in the second scanning operation to the code generating circuit 102 through the selection circuit 113.

If $F_T > F_1$, as in the above description, $\alpha_t$ exists between $\alpha_0$ and $\alpha_1$. Hence, in this case, quantization corresponding to $\alpha_0$ is successively performed, and an address of the address generator 311 at this time is supplied to the frequency distribution memory 111 through the selection circuit 110.

As described above, in this embodiment, the frequency distribution for determining the optimum encoding characteristics can be obtained while determining the optimum quantization characteristics. Therefore, a time required for determining the optimum encoding characteristics may not be added to the time required for determining the optimum quantization characteristics to prolong the entire processing time. Furthermore, in this embodiment, the number of frequency distribution memories is two, which is very small when compared to the number of prepared scale factors $\alpha_0$ to $\alpha_8$. Also, an address generator is omitted in the encoding characteristic control circuit 100, and the address generator 311 in the code length calculation circuit 301 is commonly used.

In this embodiment, the two frequency distribution memories 111 and 112 are used to decrease the circuit size. However, if the memory has an extra margin, separate frequency distribution memories corresponding to the scale factors $\alpha_0$ to $\alpha_8$ may be prepared.

In the embodiments of FIGS. 17 and 20, quantization outputs based on different scale factors are generated in the time-division manner in order to obtain the optimum scale factor in the first scanning period. However, the quantization output need not be obtained in the time-division manner, and quantization outputs based on different scale factors may be simultaneously obtained, as in the embodiment of FIG. 1. In this case, however, frequency distribution memories must be prepared to correspond in number to the scale factors.

FIG. 22 is a block diagram summarizing the respective embodiments described above. More specifically, the present invention constitutes an image data compressing apparatus for compressing and outputting input image data. A DCT circuit 21 receives block data obtained by dividing input image data into blocks, and obtains a DCT coefficient by subjecting the input block data to Discrete Cosine Transformation (DCT) in units of blocks. A quantization circuit 26 obtains a quantization output by quantizing the DCT coefficient obtained by the DCT circuit 21. An encoding circuit 32 obtains an encoded output by subjecting the quantization output obtained by the quantization circuit 26 in accordance with variable length encoding. An optimum compression characteristic controller 400 receives at least one of the DCT coefficient, the quantization output, and the encoded output and generates an optimum quantization coefficient used by at least the quantization circuit 26. During the first scanning period corresponding to one frame of image data, the optimum compression characteristic controller 400 quantizes the DCT coefficient by using a plurality of quantization coefficients, thus obtaining a plurality of quantization outputs, obtains the calculated total bit counts of the plurality of encoded outputs corresponding to the plurality of quantization outputs, generates an optimum quantization coefficient corresponding to the input image data from the operation result performed by using one of the plurality of calculated total bit counts which is close to the target total bit count, and supplies the optimum quantization coefficient to the quantization circuit 26, thereby setting the optimum compression characteristics for the second scanning operation. The optimum compression characteristic controller 400 can also set optimum encoding characteristics for the encoding circuit 32.

Industrial Applicability

As has been described above, the apparatus of the present invention is useful for compressing, by encoding, and transmitting still and motion images of a visual telephone, an image transmitting apparatus, an image processing apparatus, an electronic still camera, and the like.

We claim:

1. An image data compression apparatus for compressing image data comprising:

DCT means for receiving block data obtained by dividing the image data into blocks of data and for obtaining DCT coefficients by performing a discrete cosine transformation of the block data;

main quantizing means for obtaining a optimum quantization output by quantizing, in accordance with an optimum quantization coefficient, the DCT coefficients obtained by the DCT means;

main encoding means for obtaining an encoded output by variable length encoding the optimum quantization output from the main quantizing means; and optimum compression characteristic determining means for receiving the optimum quantization output from the main quantizing means, for generating the optimum quantization coefficient to be used by the main quantizing means, and for feeding back the optimum quantization coefficient to the main quantizing means;

wherein the optimum compression characteristic determining means generates the optimum quantization coefficient by:

quantizing the DCT coefficients through the use of a plurality of different quantization coefficients during a first scanning period corresponding to one frame of the image data so as to produce a plurality of quantization outputs;

encoding the plurality of quantization outputs;

obtaining a plurality of total bit counts corresponding to the encoded plurality of quantization outputs; and executing a predetermined operation by using at least one of the plurality of total bit counts which is approximate to a target total bit count, and thereby generating the optimum quantization coefficient.

2. An image data compressing apparatus according to claim 1, characterized in that said optimum compression characteristic determining means comprises a plurality of quantization circuits for receiving the DCT coefficient and quantizing the DCT coefficient by different quantization coefficients, calculating means for calculating code lengths obtained by encoding quantization outputs output from said plurality of quantization circuits, thereby obtaining the plurality of calculated total bit counts corresponding to the plurality of quantization outputs, and means for generating the optimum quantization coefficient for the input image data from the operation result obtained by using one of the plurality of calculated total bit numbers obtained by said calculating means which is close to the target total bit count.

3. An image data compressing apparatus according to claim 1, characterized in that said optimum compression characteristic determining means comprises operating means for receiving the quantization output from said quantizing means, and obtaining a plurality of quantization outputs by multiplying the quantization output by different factors, calculating means for calculating code lengths obtained by encoding the plurality of quantization outputs, thereby obtaining the plurality of calculated total bit counts corresponding to the plurality of quantization outputs, and means for generating the optimum quantization coefficient for the input image data from the operation result obtained by using one of the plurality of calculated total bit counts obtained by said calculating means which is close to the target total bit count.

4. An image data compressing apparatus according to claim 1, characterized in that said optimum compression characteristic determining means comprises bit shift means for receiving the quantization output from said quantizing means and obtaining a plurality of quantization outputs by subjecting the quantization output to bit shifting for different bit counts, calculating means for calculating code lengths obtained by encoding the plurality of quantization outputs, thereby obtaining the plurality of calculated total bit counts corresponding to the plurality of quantization outputs, and means for generating the optimum quantization coefficient for the input image data from the operation result obtained by using one of the plurality of calculated total bit counts obtained by said calculating means which is close to the target total bit count.

5. An image data compressing apparatus according to claim 1, characterized in that said optimum compression characteristic determining means comprises means for cyclically supplying a plurality of types of quantization coefficients to said quantizing means during the first scanning period in the time-division manner, and obtaining a plurality of quantization outputs, calculating means for calculating code lengths obtained by encoding the plurality of quantization outputs, thereby obtaining the plurality of calculated total bit counts corresponding to the plurality of quantization outputs, and means for generating the optimum quantization coefficient for the input image data from the operation result obtained by using one of the plurality of calculated total bit counts obtained by said calculating means which is close to the target total bit count.

6. An image data compressing apparatus according to claim 5, characterized in that said means, of said optimum compression characteristic determining means, for obtaining the plurality of quantization outputs is commonly used as said main quantizing means.

7. An image data compressing apparatus according to claim 1, characterized in that said optimum compression characteristic determining means comprises operating means for receiving the quantization output from said quantizing means and supplying different factors to the quantization output, thereby obtaining a plurality of quantization outputs, calculating means for calculating code lengths obtained by encoding the plurality of quantization outputs, thereby obtaining the plurality of calculated total bit counts corresponding to the plurality of quantization outputs, and means for generating the optimum quantization coefficient for the input image data from the operation result obtained by using one of the plurality of calculated total bit counts obtained by said calculating means which is close to the target total bit count.

8. An image data compression apparatus according to claim 1, wherein the optimum compression characteristic determining means comprises:

means for dividing the image data into the blocks of data by intermittently extracting portions of one frame of data from the image data and for cyclically supplying the extracted portions of the one from of the image data to the DCT means as the block data during the first scanning period;

means for quantizing, through the use of the plurality of different quantization coefficients, the DCT coefficients produced by the DCT means which has been cyclically supplied with the extracted portions of the one frame of the image data;

encoding means for encoding the plurality of quantization outputs;

means for obtaining the total bit counts corresponding to the encoded plurality of quantization outputs; and means for executing the predetermined operation.

9. An image data compression apparatus according to claim 8, wherein:

the encoding means is also used as the main encoding means; and the means for executing the predetermined operation uses, as the at least one of the plurality of total bit counts which is approximate to the target total bit count, a first and a second approximate total bit count, which are selected from said plurality of calculated total bit counts to be approximate to the target total bit count and are larger than and smaller than the target total bit count, respectively.

10. An image data compressing apparatus according to claim 1, characterized in that said optimum compression characteristic determining means comprises means for cyclically supplying block data of blocks interlaced from all blocks corresponding to one frame of the input image data to said DCT circuit, means for supplying different types of quantization coefficients to a DCT coefficient of each cycle, thereby obtaining a plurality of quantization outputs in the time-division manner, calculating means for calculating code lengths obtained by encoding the plurality of quantization outputs, thereby obtaining the plurality of calculated total bit counts corresponding to the plurality of quantization outputs, means for detecting, from the plurality of calculated total bit counts obtained by said calculating means, two approximate calculated total bit counts close to the target total bit count and larger and smaller, respectively, than the target total bit count, and generating the optimum quantization coefficient of the input image data from the operation result performed by using the two approximate calculated total bit counts, frequency distribution generating means for receiving the plurality of quantization outputs, and calculating distributions of generation frequencies of respective data of the plurality of quantization outputs, when the plurality of calculated total bit counts are obtained, thereby generating a plurality of frequency distributions, code generating means for receiving, of the plurality of frequency distributions generated by said frequency distribution generating means, a frequency distribution corresponding to at least the two approximate calculated total bit counts, and generating an optimum variable length code table corresponding to the selected frequency distribution, and generating means for supplying the optimum variable length code table generated by said code generating means to said main encoding means.

11. An image data compressing apparatus according to claim 1, characterized in that said optimum compression characteristic determining means comprises means for cyclically supplying block data of blocks interlaced from all blocks corresponding to one frame of the input image data to said DCT circuit, means for supplying different types of quantization coefficients to a DCT coefficient of each cycle, thereby obtaining a plurality of quantization outputs in the time-division manner, calculating means for generating a value (address) to which a code corresponding to each quantization output is assigned, and detecting a code length of each quantization output by using the generated address, thereby obtaining code lengths obtained by encoding the plurality of quantization outputs, and obtaining the plurality of calculated total bit counts corresponding to the plurality of quantization outputs, means for detecting, from the plurality of calculated total bit counts obtained by said calculating means, two approximate calculated total bit counts close to the target total bit count and larger and smaller, respectively, than the target total bit count, and generating the optimum quantization coefficient of the input image data from the operation result performed by using the two approximate calculated total bit counts, frequency distribution generating means for calculating distributions of generation frequencies of respective data of the plurality of quantization outputs by using the address generated by said calculating means, when the plurality of calculated total bit counts are obtained, thereby generating a plurality of frequency distributions, code generating means for receiving, of the plurality of frequency distributions generated by said frequency distribution generating means, a frequency distribution corresponding to at least the two approximate calculated total bit counts, and generating an optimum variable length code table corresponding to the selected frequency distribution, and generating means for supplying the optimum variable length code table generated by said code generating means to said main encoding means.

12. An image data compressing apparatus according to claim 1, characterized by further comprising activity calculating means for receiving the DCT coefficient output from said DCT circuit and calculating an activity representing fineness of an image, and bit distributing means for supplying an output from said activity calculating means, determining a preset bit count of each block in units of blocks in accordance with the fineness of the image, and supplying the preset bit count to said main encoding means.

13. An image data compressing apparatus according to claim 12, characterized in that said main encoding means has Haffman coding means for encoding at least an AC term of a quantization output obtained from said main quantizing means in accordance with Haffman coding, EOB inserting means for receiving an output from said Haffman coding means and capable of inserting an end-of-block code in an encoded output corresponding to the block, and bit count calculating means for supplying the output from said Haffman coding means, calculating a bit count of the encoded output corresponding to the block, and supplying an EOB insertion command signal to said EOB inserting means when a calculation result reaches the preset bit count.

* * * * *